(12) United States Patent
Hagemeister et al.

(10) Patent No.: US 7,581,697 B1
(45) Date of Patent: Sep. 1, 2009

(54) DESIGN METHODS AND CONFIGURATIONS FOR SUPERSONIC AIRCRAFT

(75) Inventors: Corey Hagemeister, Andover, KS (US); David C. Aronstein, Rose Hill, KS (US); Kurt L. Schueler, Lawrence, KS (US)

(73) Assignee: Hawker Beechcraft Corporation, Wichita, KS (US)

( * ) Notice: Subject to any disclaimer, the term of this patent is extended or adjusted under 35 U.S.C. 154(b) by 0 days.

(21) Appl. No.: 11/743,631

(22) Filed: May 2, 2007

Related U.S. Application Data

(62) Division of application No. 10/909,001, filed on Jul. 29, 2004, now Pat. No. 7,252,263.

(51) Int. Cl.
*B64C 1/00* (2006.01)
(52) U.S. Cl. ............... 244/117 R; 244/119; 244/1 R; 703/1; 703/8
(58) Field of Classification Search ............. 244/117 R, 244/1 R, 119, 130; 703/1, 8
See application file for complete search history.

(56) References Cited

U.S. PATENT DOCUMENTS

| | | | |
|---|---|---|---|
| RE36,298 E | 9/1999 | Scherrer et al. ............... 342/2 |
| D417,184 S | 11/1999 | Hartmann et al. .......... D12/333 |
| 6,729,577 B2 | 5/2004 | Morgenstern ............. 244/45 R |
| 6,942,178 B2 | 9/2005 | Morgenstern et al. ..... 244/35 A |
| 6,959,896 B2 | 11/2005 | Hartmann et al. ......... 244/35 A |
| 7,043,463 B2 | 5/2006 | Bonabeau et al. ............. 706/13 |
| 2005/0116108 A1* | 6/2005 | Morgenstern et al. ....... 244/130 |
| 2005/0218267 A1 | 10/2005 | Makino ....................... 244/130 |
| 2005/0224630 A1 | 10/2005 | Henne et al. ................ 244/1 N |
| 2006/0157613 A1 | 7/2006 | Adamson et al. ............. 244/1 N |

OTHER PUBLICATIONS

Morgenstern, "Low Sonic Boom Design And Performance Of A Mach 2.4/1.8 Overland High Speed Civil Transport", NAS1-19345, 1992, pp. 55-63.

Hayes et al., "Sonic-Boom Propagation Through A Stratified Atmosphere", The Journal Of The Acoustical Society Of America, 1972, vol. 51, No. 2, Part 3, pp. 695-701.

Aronstein, "Conceptual Design Of A Sonic Boom Constrained Supersonic Business Aircraft", American Institute Of Aeronautics And Astronautics, 42$^{nd}$ Aerospace Science Meeting, NASA Langley Research Center, Jan. 5, 2004, pp. 1-11.

Lockheed SR-71 Blackbird, Smithsonian National Air And Space Museum, http://www.nasm.si.edu/research/aero/aircraft/lockheed_sr71.htm, © 1998-2001, revised Sep. 3, 2001, 8 pgs.

(Continued)

*Primary Examiner*—J. Woodrow Eldred
(74) *Attorney, Agent, or Firm*—Lerner, David, Littenberg, Krumholz & Mentlik, LLP

(57) ABSTRACT

Methods for configuring aircraft that may be implemented to integrate aircraft sonic boom constraint requirements with the design process for a supersonic aircraft, for example, to reconcile a target sonic boom constraint with the internal layout and balance of the aircraft during the design phase. The disclosed methods may advantageously be employed in one embodiment to allow a sonic boom-constrained aircraft design configuration solution to be reached that incorporates a desired sonic boom signature with the requirements of an internal configuration layout. Resulting aircraft configurations may be usefully employed for achieving sonic boom suppression on any type of supersonic-capable aircraft, for example, a civil supersonic business aircraft.

6 Claims, 17 Drawing Sheets

OTHER PUBLICATIONS

YF-12 Blackbird, file://www.dfrc.nasa.gov/gallery.movie/yf-12, last modified Aug. 3, 2003, 2 pgs.
Driver, "What Gross Weight And Range For An Advanced HSCT?", Nasa Ames Research Center, Feb. 1992, pp. 45-54.
Carlson et al., "Review Of Sonic-Boom Generation Theory And Prediction Methods", The Journal Of The Acoustical Society Of America, vol. 51, No. 2, 1972, pp. 675-694.
Baize et al ; "A Mach 2.0/1.6 Low Sonic Boom High-Speed Civil Transport Concept", High Speed Research Program 1993 Sonic Boom Workshop, NASA Langley Research Center, 1993, pp. 125-142.
Cheung et al, "Supersonic Airplane Design Optimization Method For Aerodynamic Performance And Low Sonic Boom", Nasa Ames Research Center, Feb. 1992, pp. 31-43.
Mack et al., "An Analysis Of Measured Sonic-Boom Pressure Signatures From A Langley Wind-Tunnel Model Of A Supersonic-Cruise Business Jet Concept", "Sonic Boom Tests Of Model Of A Supersonic Business Jet Plane", NASA Tech Briefs LAR-16277, NASA Langley Research Center, Feb. 12, 2001, 14 pgs.
Bateau et al ; "Beyond the Barrier: The Case For A Practical Civil Supersonic Transport", Massachusetts Institute Of Technology Aircraft Systems Engineering Course 16.899, May 17, 2001, 138 pgs.
Alonso et al , "Advanced Algorithms For Design And Optimization of Quiet Supersonic Platforms", AIAA 2002-0144, 40th AIAA Aerospace Sciences Meeting and Exhibit, Jan. 14-17, 2002, 14 pgs.
Nadarajah et al., "Sonic Boom Reduction Using An Adjoint Method For Wing-Body Configurations In Supersonic Flow", AIAA 2002-5547, 9th AIAA/ISSMO Symposium On Multidisciplinary Analysis And Optimization, Sep. 4-6, 2002, 10 pgs.
Hartwich et al., "Design Development Strategies And Technology Integration For Supersonic Aircraft Of Low Perceived Sonic Boom", AIAA 2003-556, American Institute Of Aeronautics & Astronautics 41st Aerospace Sciences Meeting And Exhibit, Jan. 6-9, 2003, 12 pgs.
Howe, "Sonic Boom Reduction Through The Use Of Non-Axisymmetric Configuration Shaping", AIAA 2003-0929, 41th AIAA Aerospace Sciences Meeting And Exhibit, Jan. 6-9, 2003, © 2002, 10 pgs.
Wolz, "A Summary Of Recent Supersonic Vehicle Studies At Gulfstream Aerospace", AIAA 2003-0558, 41st AIAA Aerospace Sciences Meeting And Exhibit, Jan. 6-9, 2003, 9 pgs.
Pawlowski et al , "Overview Of The Shaped Sonic Boom Demonstrator Program", Abstract For The Society Of Automotive Engineers, Published In Advance Of The General Aviation Technology Conference and Exhibition, Apr. 20-22, 2004, 1 pg.
DeMeis, "Sukhoi And Gulfstream Go Supersonic", Aerospace America, Apr. 1990, pp. 40-42.
Bruner, "SSBJ A Technological Challenge", ICAO Journal, Aug. 1991, pp. 9-13.
Maglieri, "A Compilation And Review Of Supersonic Business Jet Studies", Eagle Aeronautics, Inc , Mar. 31, 1996, 38 pgs.
Sukhoi, "Jane's All The World's Aircraft", 1997-98 Edition, pp. 447-448.
McLaren, "Defining A First-Generation SSBJ", Professional Pilot, Dec. 1998, 4 pgs.
Mack et al , "A Practical Low-Boom Overpressure Signature Based On Minimum Sonic Boom Theory", High Speed Research: Sonic Boom vol. 11, NASA Conference Publication 3173, 1992, pp. 15-29.
Saiyed, Initial Development Of Technology Goals And Roadmaps for 12 National Air Vehicles, Vehicle Systems Program, NASA, Apr. 21, 2003, 59 pgs.
Darden, "Sonic Boom Minimization With Nose-Bluntness Relazation", NASA Tp-1348, 1979, 53 pgs.
Coen, "Development Of A Computer Technique For The Prediction Of Transport Aircraft Flight Profile Sonic Boom Signatures", Mar. 1991, 70 pgs.
Harris, "An Analysis And Correlation Of Aircraft Wave Drag", Langley Research Center, Nasa Technical Memorandum, NASA TM X-947, National Aeronautics And Space Administration, Mar. 1964, 65 pgs.
Whitham, The Flow Pattern Of A Supersonic Projectile:, Communications On Pure And Applied Mathematics, v.V, n.3, Aug. 1952, pp. 301-348.
Walkden, "The Shock Pattern Of A Wing-Body Combination, Far From The Flight Path", Aeronautical Quarterly v IX, pt. 2, May 1958, pp. 164-194.
Seebass et al , "Sonic Boom Minimization", Journal Of the Acoustical Society Of America, v. 51, n.2, pt. 3, Feb. 1972, pp. 686-694.
Raymer, Aircraft Design: A Conceptual Approach, 3rd Edition, American Institute Of Aeronautics * Astronautics, 1999, pp. 267-269.
Haglund, "Nacelle And Forebody Considerations In Design For Reduced Sonic Boom", NAS1-19360, Task 6, 1991-1992, pp. 237-250.
Mack, "Some Considerations On The Integration Of Engine Nacelles Into Low-Boom Aircraft Concepts", NASA Langley Research Center, Feb. 1992, pp. 221-235.
Haglund et al , "Two HSCT Mach 1 7 Low Sonic Boom Designs", NAS3-25963, Feb. 1992, pp. 65-87.
Mack, "An Analysis Of Measured Sonic-Boom Pressure Signatures From A Langley Wind-Tunnel Model Of A Supersonic-Cruise Business Jet Concept", NASA/TM-2003-212447, Langley Research Center, Oct. 2003, 19 pgs.
Baals et al , "Aerodynamic Design Integration Of Supersonic Aircraft", Journal of Aircraft, vol. 7, No. 5, Sep.-Oct. 1970, pp. 385-394.
Jones, "Theory Of Wing-Body Drag At Supersonic Speeds", National Advisory Committee For Aeronautics, Report 1284, Jul 8, 1953, pp. 757-763.

* cited by examiner

DESIGN METHODS AND CONFIGURATIONS FOR SUPERSONIC AIRCRAFT

RELATED APPLICATIONS

This application is a divisional of U.S. application Ser. No. 10/909,001, filed Jul. 29, 2004 now U.S. Pat. No. 7,252,263, the entire contents of which are incorporated herein by reference.

BACKGROUND OF THE INVENTION

1. Field of the Invention

This invention relates generally to methods for configuring aircraft, and more particularly to design methods and configurations for supersonic aircraft.

2. Background

Current supersonic aircraft designs provide passengers and cargo with reduced flight times, but at the cost of the noise produced by sonic booms. Due to adverse public perception of the noise associated with sonic booms, civil regulations currently prohibit overland supersonic flights in the continental United States. As a result, successful business and commercial aircraft development has generally been limited to subsonic designs. A variety of supersonic military aircraft designs are operationally employed, however, the scope of military supersonic flight operations is sometimes limited due to sonic boom noise.

The theory of sonic boom reduction has been in existence since the 1960s. However, no supersonic aircraft that incorporates sonic boom reducing design features has ever entered production or operational use. Many design studies have been performed, but few have led to promising designs. Implementing a constrained sonic boom signature imposes an exact requirement on the distribution of a quantity called "equivalent area" along the lengthwise axis of the vehicle. Equivalent area at a given location is the sum of a term that is related to the local cross sectional area at that location, plus a term that is proportional to the cumulative lift between the nose of the aircraft and the given location. Thus, the equivalent area distribution involves a combination of the cross sectional area distribution and the lift distribution.

Prior attempts to design passenger aircraft with reduced sonic boom have typically used cross-sectional area only, at least as far aft as the beginning of the passenger cabin, to provide the required equivalent area distribution. With the lift distribution beginning aft of that point, lift must then be built up fairly rapidly in order to provide the center of lift at the center of gravity. The tradeoff between lift and cross section then produces a pinched section near the middle of the vehicle. This pinching is known as "area-ruling" and it is common even on supersonic vehicles which are not designed for reduced sonic boom. However, designing to a sonic boom requirement tends to aggravate the pinching if conventional design approaches are followed.

Such pinched-fuselage designs suffer from several shortcomings. For example, a small fuselage cross section is undesirable near the middle of the fuselage, where maximum bending strength is required and where the main landing gear is typically stowed. A pinched midsection also makes it more difficult to balance an aircraft configuration at the center of lift because the lift distribution tends to be too far aft relative to the location of the payload. However, moving the center of lift forward tends to further aggravate the pinching of the fuselage. Furthermore, with such pinched-fuselage designs useful volume for payload and fuel tends to lie in the forward and aft extremities of the aircraft, respectively. This widely dispersed mass distribution tends to lead to a high mass moment of inertia about the pitch axis, high structural loads and large variations in the location of the center of gravity. In addition, the relative large forward fuselage cross section tends to be larger than optimum for wave drag.

SUMMARY OF THE INVENTION

Disclosed herein are methods for configuring aircraft that may be implemented to integrate aircraft sonic boom constraint requirements with the design process for a supersonic aircraft, for example, to reconcile a target sonic boom constraint with the internal layout and balance of the aircraft. Unlike prior supersonic aircraft design efforts that have typically focused either on constraining the sonic boom signature of the aircraft, or on the detailed configuration and performance of the supersonic aircraft, the disclosed methods may be advantageously implemented to integrate all of these elements (i.e., sonic boom signature, detailed internal and external configuration, and performance) into a specific viable aircraft during the design phase. The disclosed methods may advantageously be employed in one embodiment to allow a sonic boom-constrained aircraft design configuration solution to be reached that incorporates a constrained sonic boom signature with the requirements of an internal configuration layout. Such aircraft configurations may be usefully employed for achieving sonic boom suppression on any type of supersonic-capable aircraft, but in one embodiment may be advantageously implemented in the design of a civil supersonic business aircraft.

The disclosed methods may be implemented with respect to balancing and volume management tasks during the design process, for example, by utilizing concurrent management of aircraft design parameters such as internal layout, external volume distribution, center of lift, and center of gravity. The disclosed methods may be advantageously implemented in a manner that achieves a controlled distribution of equivalent area while at the same time achieving a viable aircraft configuration. In one example, the disclosed methods may be implemented using a two-dimensional representation of the internal volume utilization, which may be linked to an automated weight and balance calculation. A two-dimensional graphical representation may be formulated to include, for example, criteria such as the available cross sectional area in the fuselage, and major internal items (e.g., nose gear, baggage, crew station, fuel tanks, main gear, engine, auxiliary power unit ("APU"), hydraulics and electronics, cables and conduits, etc.) that are to be located in the available area. Thus, the disclosed methods may be implemented to address configuration choices in the sizing and conceptual design phases of the sonic boom constrained aircraft that are typically addressed in later stages of traditional preliminary design cycles. In one embodiment, the disclosed method may be advantageously implemented as a design tool (e.g., software and graphics-based utility) that permits the user to rapidly manipulate the internal arrangement and monitor compliance with various design requirements.

In one exemplary embodiment disclosed herein, an aircraft may be configured to meet a given sonic boom signature constraint by controlling distribution of equivalent area in a managed manner. In this regard, a target total equivalent area distribution may be first selected (e.g. an equivalent area distribution that will achieve desired sonic boom signature), and then allocated into equivalent area contributions of lift and volume (e.g., cross section) in a manner that satisfies one or more needed or desired design characteristics (e.g., such as a minimum specified cabin width at the fuselage midsection, landing gear stowage, fuel & subsystems volume, etc). For example, given a total equivalent area distribution, a distribution of equivalent area due to lift may be determined (e.g., based on a determined drag due to lift value) along with its corresponding center of lift. Next, an equivalent area distribution due to volume (e.g., cross sectional area) may be determined by subtracting the distribution of equivalent area due to lift from the target total equivalent area distribution. At this point, available volume may be allocated to achieve a center of gravity that corresponds with the center of lift by managing the placement of airframe components and internal components in the following manner. The equivalent area distribution of desired major airframe components (e.g., fuselage, wing, tail, nacelles and engines, etc.) may be first subtracted from the equivalent area distribution due to volume, leaving an available equivalent area for internal components (e.g., crew station, cabin, baggage compartment, landing gear, fuel, etc.). Internal components may then be arranged within the remaining equivalent area, and the resulting available range of center of gravity compared to the determined center of lift.

Also disclosed herein are aircraft configurations that are based on a controlled distribution of equivalent area in conjunction with aircraft design parameters (e.g., internal layout, external volume distribution, center of lift, and center of gravity, etc.) that have been concurrently managed to meet a given sonic boom signature constraint using the methods described herein. In one exemplary embodiment, for example, a supersonic aircraft configuration may be provided that incorporates a constrained sonic boom signature, a unique fuselage shape, a single continuous lifting wing surface platform, aft placed engine nacelles, a mid fuselage-located cabin, and an artificial or synthetic cockpit vision system for pilot visibility. These attributes advantageously produce a balanced weight distribution. The center of gravity can be placed at the aircraft's cruise speed center of lift at all weights of the aircraft from start of cruise to end of cruise. The center of gravity location for this configuration is also satisfactory from a stability and control stand point at all weights within the design weight range of the aircraft in subsonic and supersonic flight. In a particular exemplary embodiment, the crew station and cabin may be located amidships (e.g., with the forward end of the crew compartment located significantly aft of the wing root leading edge), rather than in the nose section of the aircraft.

In one respect, disclosed herein is a method of configuring an aircraft with external and internal components, and an aircraft that is configured using this method. The method may include the following steps: a) defining a target sonic boom signature for the aircraft; b) determining a target distribution of total equivalent area based at least in part on the target sonic boom signature; c) defining a configuration of one or more external airframe components for the aircraft, the one or more external airframe components including a wing configuration having a corresponding distribution of equivalent area due to lift; d) determining an equivalent body area distribution for the aircraft based at least in part on the target distribution of total equivalent area and the distribution of equivalent area due to lift for the defined wing configuration; e) defining a location of one or more selected internal aircraft components within an available cross sectional area represented by the determined equivalent body area distribution; f) determining if sufficient cross sectional area exists for the defined location of the one or more selected internal aircraft components of step e) within the available cross sectional area represented by the determined equivalent body area distribution of step d), and if insufficient area is determined to exist for the defined location of the one or more selected internal aircraft components within the available cross sectional area, then redefining a configuration of one or more of the external airframe components of step c) for the aircraft to determine a revised distribution of equivalent area due to lift for the aircraft; and g) repeating steps d) through f) until sufficient cross sectional area is determined to exist for the defined location of the one or more selected internal aircraft components of step e) within an available cross sectional area represented by the determined equivalent body area distribution of step d).

In another respect, disclosed herein is a method of configuring an aircraft with external and internal components based on a given target distribution of total equivalent area, and an aircraft that is configured using this method. The method may include the following steps: a) defining a configuration of one or more external airframe components for the aircraft, the one or more external airframe components including a wing configuration having a corresponding distribution of equivalent area due to lift; b) determining an equivalent body area distribution for the aircraft based at least in part on a given target distribution of total equivalent area and the distribution of equivalent area due to lift for the defined wing configuration, the given target distribution of total equivalent area corresponding to a given target sonic boom signature; c) defining a location of one or more selected internal aircraft components within an available cross sectional area represented by the determined equivalent body area distribution; d) determining if sufficient cross sectional area exists for the defined location of the one or more selected internal aircraft components of step c) within the available cross sectional area represented by the determined equivalent body area distribution of step b), and if insufficient area is determined to exist for the defined location of the one or more selected internal aircraft components within the available cross sectional area, then redefining a configuration of one or more of the external airframe components of step a) for the aircraft to determine a revised distribution of equivalent area due to lift for the aircraft; and e) repeating steps b) through d) until sufficient cross sectional area is determined to exist for the defined location of the one or more selected internal aircraft components of step c) within an available cross sectional area represented by the determined equivalent body area distribution of step b).

In another respect, disclosed herein is a method of configuring supersonic aircraft, the method including concurrently managing internal layout, external volume distribution, center of lift, and center of gravity of the aircraft to achieve a controlled distribution of equivalent area that corresponds to a target sonic boom signature. The method may further include managing internal layout of the aircraft using a two-dimensional representation of internal volume utilization of the aircraft. The two-dimensional representation of internal volume utilization of the aircraft may be linked to an automated weight and balance calculation. The method may further include using the two-dimensional representation of internal volume utilization of the aircraft to manipulate an internal arrangement of one or more internal components of the aircraft within available internal cross sectional area of the aircraft. The two-dimensional representation of internal volume utilization of the aircraft may include a two-dimensional graphical display capable of displaying the available internal cross sectional area in a fuselage area of the aircraft simultaneously with the one or more internal components of the aircraft; and the method may further include manipulating in real time an internal arrangement of the one or more internal aircraft components within the available internal cross sectional area of the aircraft using the two dimensional graphical display. The method may further include automatically calculating a center of gravity of the aircraft in real time based on the manipulated internal arrangement of the one or more internal aircraft components within the available internal cross sectional area of the aircraft. The concurrent management of this method may be performed dynamically in real time using an automated or partially automated software or hardware tool configured to accept information from a user in real time and to display information to a user in real time.

In another respect, a software or hardware-based aircraft design tool may be provided that includes an input means for accepting information from a user; a display means for displaying information to the user; and a computing means for implementing any one or more of the disclosed methods by accepting the aforedescribed information from the user and by displaying the aforedescribed information to the user.

In another respect, disclosed herein is a supersonic aircraft that includes a fuselage and two wings coupled to the fuselage, the fuselage having an internal volume and each of the wings having an exposed wing root leading edge; a crew station and passenger cabin defined within the internal volume of the fuselage, the passenger cabin being located aft of the crew station. The supersonic aircraft may have a total length defined between a nose end and a tail end of the aircraft, and at least one of the following conditions may apply: a forward end of the crew station may be located at a distance of greater than or equal to about 10% of the overall length of the aircraft in a direction aft of a position of the exposed wing root leading edge of each of the wings of the aircraft, a forward end of the crew station may be located at a distance of greater than or equal to about 30% of the total length of the aircraft in a direction aft of the nose end of the aircraft, or a combination thereof.

DESCRIPTION OF THE ILLUSTRATIVE EMBODIMENTS

Using the disclosed methods, sonic boom mitigation for an aircraft having one or more target design parameters may be achieved through management of lift and volume buildup of the aircraft along its longitudinal axis during the conceptual design process to integrate a target sonic boom signature into a viable supersonic aircraft design. As used herein, a "target sonic boom signature" refers to a sonic boom signature that is designed to meet one or more given sonic boom signature constraints, e.g., a constraint on initial overpressure, a constraint on peak overpressure, a constraint on perceived noise level, etc., or a combination of such constraints. In this regard, supersonic aircraft configurations typically require the careful buildup of vehicle volume to minimize wave drag, but the volume trading and area ruling that are typically acceptable while designing for wave drag may result in a negative impact on sonic boom. Furthermore, the buildup of lift and volume required to meet boom constraints is an exact requirement, with any excess or shortfall adversely impacting sonic boom characteristics of the aircraft. In the practice of the disclosed methods, configuration choices that are typically considered in later stages of traditional preliminary design cycles are advantageously addressed during the sizing and conceptual design phases of a sonic boom constrained airplane. Thus, the disclosed methods may be implemented to address integration, weight and balance issues early in the design process so as to allow sonic boom constraints to be satisfied at the same time aircraft integration issues are successfully addressed.

Figure 1:
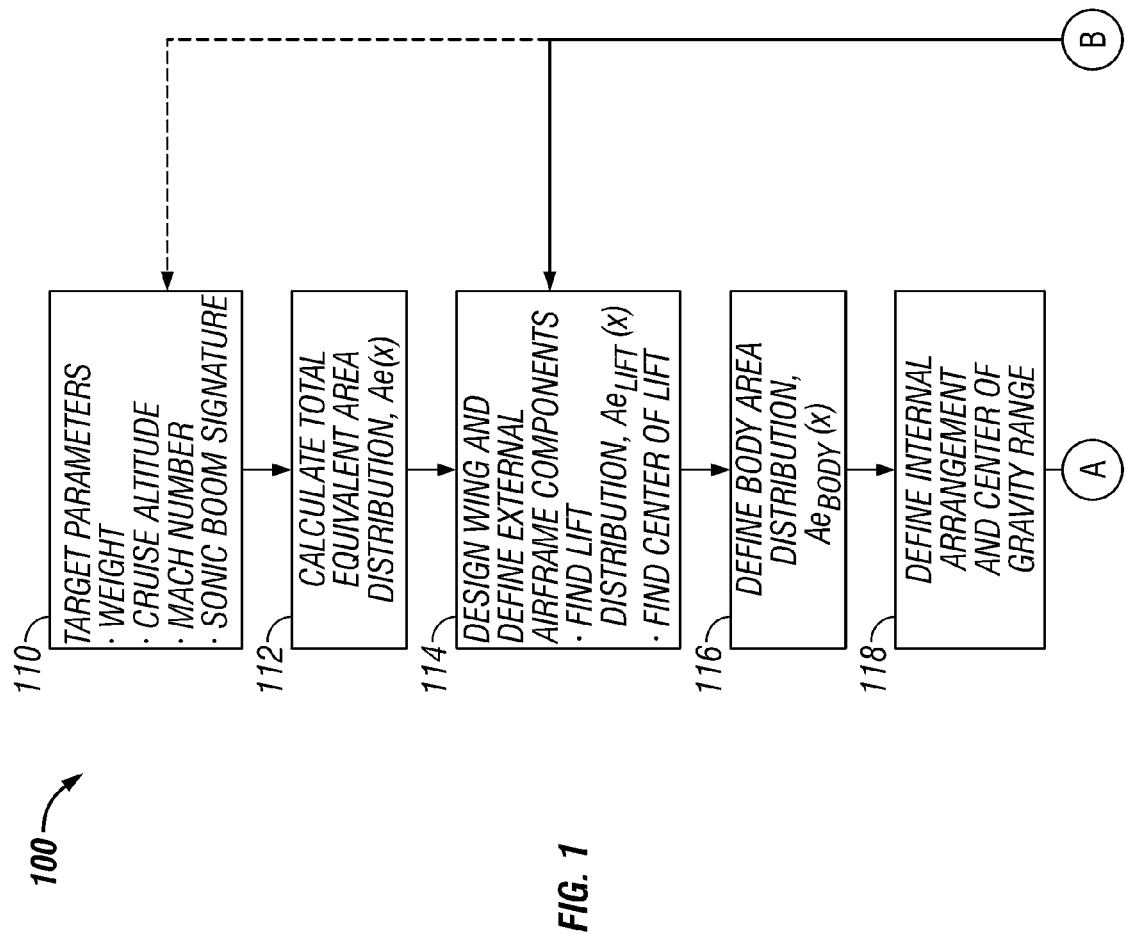
FIG. 1 illustrates a method for configuring an aircraft according to one exemplary embodiment of the methods and configurations disclosed herein.
Figure 1:
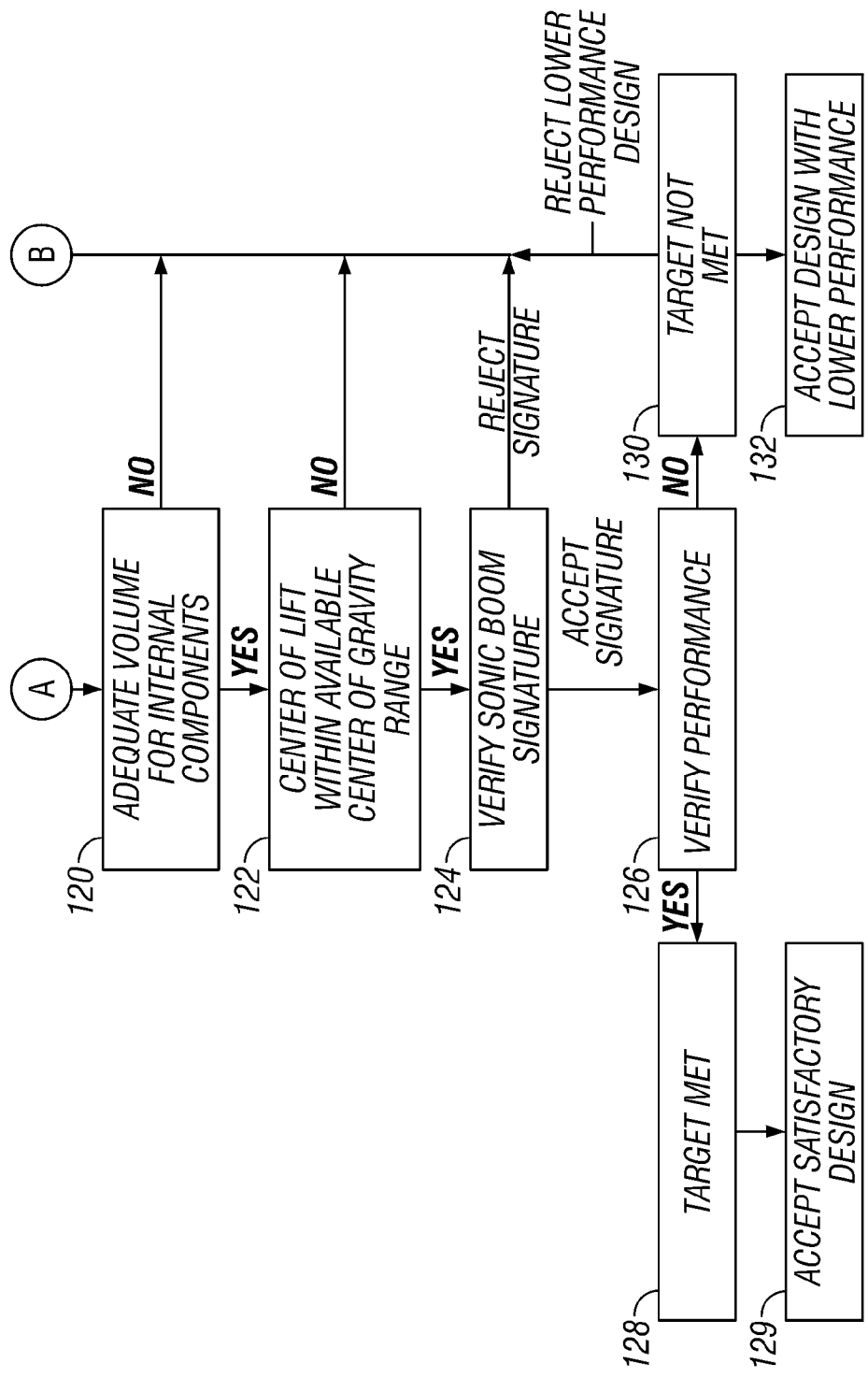

FIG. 1 illustrates one exemplary embodiment 100 of the disclosed aircraft configuration methods which may be implemented to achieve sonic boom mitigation for a given combination of target design parameters (e.g., aircraft weight, cruise speed, cruise altitude, sonic boom signature, etc.) through management of lift and volume buildup of the aircraft along its longitudinal axis. As illustrated in step 110 of FIG. 1, target requirements of weight, altitude, cruise speed (e.g., mach number), etc. may be specified to meet the requirements or desires for a given application. Table 1 is a summary of exemplary target design requirements, it being understood that other requirement values, requirement types and/or combination of target design requirement types are possible, and may be varied as needed or desired to meet the requirements of a given application. It will be understood that target design parameters include specified target design requirements such as shown in Table 1, as well as target design parameters that may be derived from such specified target design requirements, e.g., aircraft weight, cruise altitude, etc.

TABLE 1

Target Design Requirements

| | |
|---|---|
| Range (nm, design mission) | 5,000 |
| Cruise Speed (Mach) | 1.8 |
| Takeoff Field Length (ft) | 6,000 (Sea Level-SL, International Standard Atmosphere-ISA) |
| Outside Cabin Diameter (in) | ≧70 |
| Payload (passengers) | 8 (maximum) 6 (design mission) |
| Takeoff Noise | Federal Aviation Regulations ("FAR") 36 Stage 4 |
| Initial Overpressure (lb/ft$^2$) (boom constrained aircraft) | 0.4 |
| Sonic Boom Signature Shape (boom constrained aircraft) | Flat top first 10% Slope of ramped pressure rise, η = 0.3 |

Figure 2:
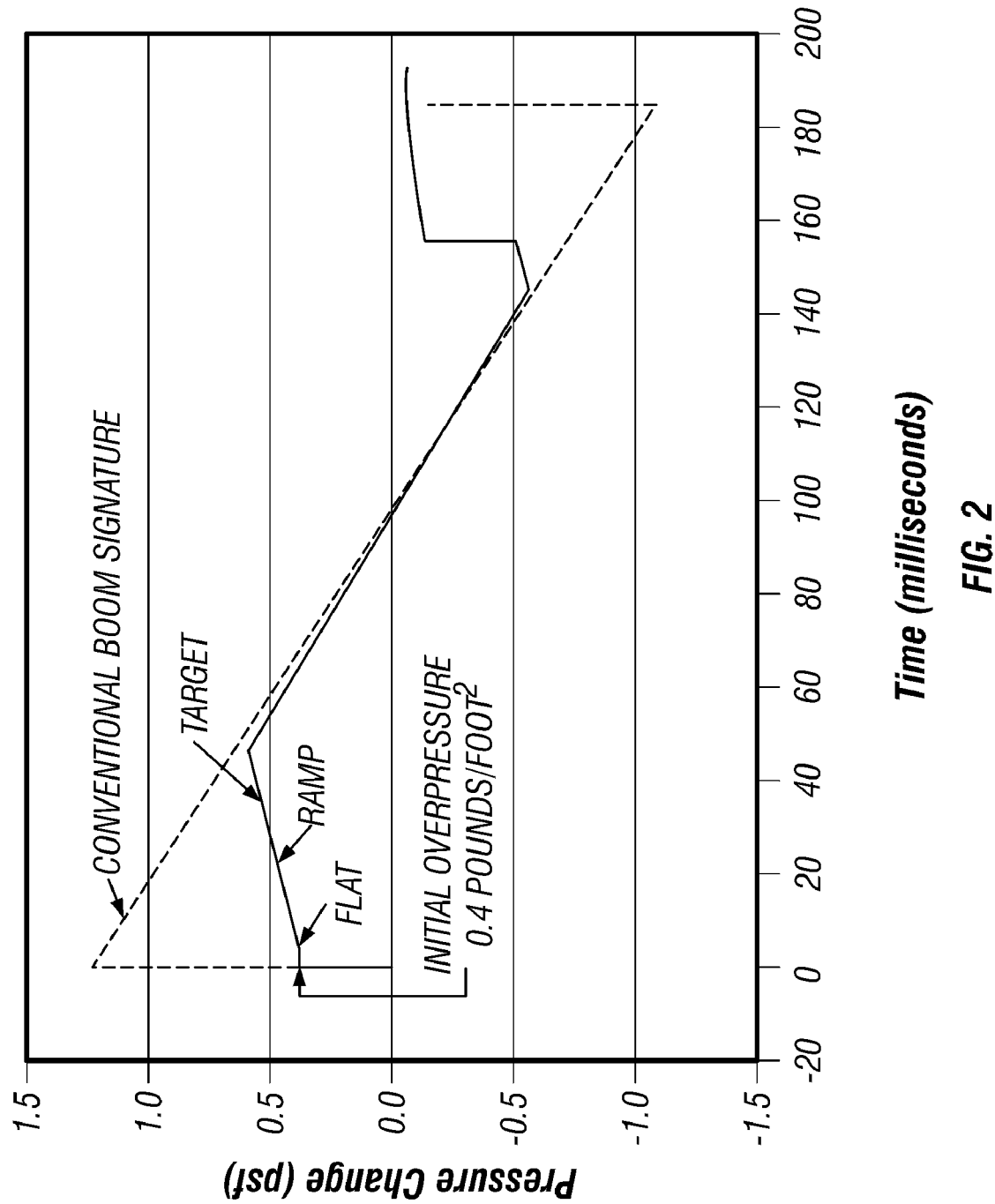
FIG. 2 illustrates a target sonic boom signature according to one exemplary embodiment of the methods and configuration disclosed herein.

With regard to the exemplary sonic boom signature shape of Table 1, FIG. 2 illustrates a target boom signature having a maximum initial overpressure of 0.4 lb/ft$^2$ that is assumed to be acceptable for this example. In this illustrated embodiment, a "hybrid" target signature shape is used, with a short flat section followed by a ramped rise. This flat section may be present, for example, to provide invariance of the initial overpressure to moderate changes in atmospheric temperature, for example, in a manner as described in Mack, R. and Haglund, G., "A Practical Low-Boom Overpressure Signature Based on Minimum Sonic Boom Theory," *High-Speed Research. Sonic Boom Volume II*, NASA Conference Publication 3173, 1992, which is incorporated herein by reference. It will be understood that the sonic boom signature shape of FIG. 2 is exemplary only, and that the disclosed methods may be practiced using any other constrained sonic boom signature shape that is needed or desired to fit the requirements of a given design application. For comparison purposes, FIG. 2 also shows the conventional boom signature that would result from a 125,000-pound aircraft flying at Mach 1.8 with no boom reduction, having an initial overpressure of approximately 1.25 lb/ft$^2$ with an "N-wave" form.

In the practice of the disclosed methods, any one or more techniques suitable for predicting and/or modeling sonic boom characteristics may be employed to develop a target sonic boom signature and/or to evaluate sonic boom characteristics of a given design. For example, sonic boom prediction may be based on the characterization of a near-field pressure signature predicted by linear theory or by computational fluid dynamics (CFD), and propagated through the atmosphere to the ground. Further information on such methods of sonic boom prediction may be found, for example, in Whitham, G. B., "The Flow Pattern of a Supersonic Projectile," *Communications on Pure and Applied Mathematics*, v.V, n.3, August, 1952; Walkden, F., "The Shock Pattern of a Wing-Body Combination, Far from the Flight Path," *Aeronautical Quarterly*, v.IX, pt. 2, May, 1958; Alonso, J. J. and Kroo, M. I., "Advanced Algorithms for Design and Optimization of Quiet Supersonic Platforms," *Proceedings of the 40th AIAA Aerospace Sciences Meeting and Exhibit*, American Institute of Aeronautics and Astronautics, Jan. 14-17, 2002, Reno, Nev.; and Hayes, W. D., Haefeli, R. C., and Kulsrud, H. E., "Sonic Boom Propagation in a Stratified Atmosphere, with Computer Program," NASA CR-1299, 1969, each of the foregoing references being incorporated herein by reference. Although particular exemplary methodology is described above, it will be understood that any other methodology suitable for predicting sonic boom characteristics may be employed in the practice of the disclosed methods.

Referring again to FIG. 1, the total equivalent area distribution may be calculated in step 112 based on the target requirements defined in step 110 using any suitable equivalent area methodology. The equivalent area distribution also sets minimum permissible equivalent length of the vehicle, to meet the sonic boom target at the assumed weight and cruise altitude. The term "equivalent area" is a quantity employed by linear theory for sonic boom analysis, and is composed of volume and lift contributions, which may be traded off against each other as long as the total matches the target distribution. Equivalent area includes a contribution from the physical cross sectional area, and a contribution from the lift. Further information on equivalent area distribution may be found in the following references which are incorporated herein by reference: Mack, R. and Haglund, G., "A Practical Low-Boom Overpressure Signature Based on Minimum Sonic Boom Theory," *High-Speed Research Sonic Boom Volume II*, NASA Conference Publication 3173, 1992; Darden, C., "Sonic Boom Minimization With Nose-Bluntness Relaxation" NASA TP-1348, 1979; Coen, P., *Development of a Computer Technique for the Prediction of Transport Aircraft Flight Profile Sonic Boom Signatures*, George Washington University Master's Thesis, 1991; Whitham, G. B., "The Flow Pattern of a Supersonic Projectile," *Communications on Pure and Applied Mathematics*, v.V, n.3, August, 1952; Walkden, F., "The Shock Pattern of a Wing-Body Combination, Far from the Flight Path," *Aeronautical Quarterly*, v.IX, pt. 2, May, 1958; Hayes, W. D., Haefeli, R. C., and Kulsrud, H. E., "Sonic Boom Propagation in a Stratified Atmosphere, with Computer Program," NASA CR-1299, 1969; and Seebass, R. and George, A. R., "Sonic Boom Minimization" *Journal of the Acoustical Society of America*, v.51, n. 2, pt. 3, February, 1972.

In one exemplary embodiment, for a given sonic boom signature target, the method of Seebass and George, as extended by Darden, Mack and Haglund (in the references cited below), may be used to generate a target distribution of the equivalent area along the length of a vehicle, and a value for the minimum permissible equivalent length of the vehicle. Further information on this methodology for generating a target distribution of equivalent area may be found, for example, in Mack, R. and Haglund, G., "A Practical Low-Boom Overpressure Signature Based on Minimum Sonic Boom Theory," *High-Speed Research: Sonic Boom Volume*

*II*, NASA Conference Publication 3173, 1992; Darden, C., "Sonic Boom Minimization With Nose-Bluntness Relaxation" NASA TP-1348, 1979; and Seebass, R. and George, A. R., "Sonic Boom Minimization" *Journal of the Acoustical Society of America*, v.51, n. 2, pt. 3, February, 1972, each of which has been incorporated herein by reference. It will be understood that any other methodology or combination of methodologies suitable for arriving at a target equivalent area distribution may be employed in the practice of the disclosed methods.

Figure 3:
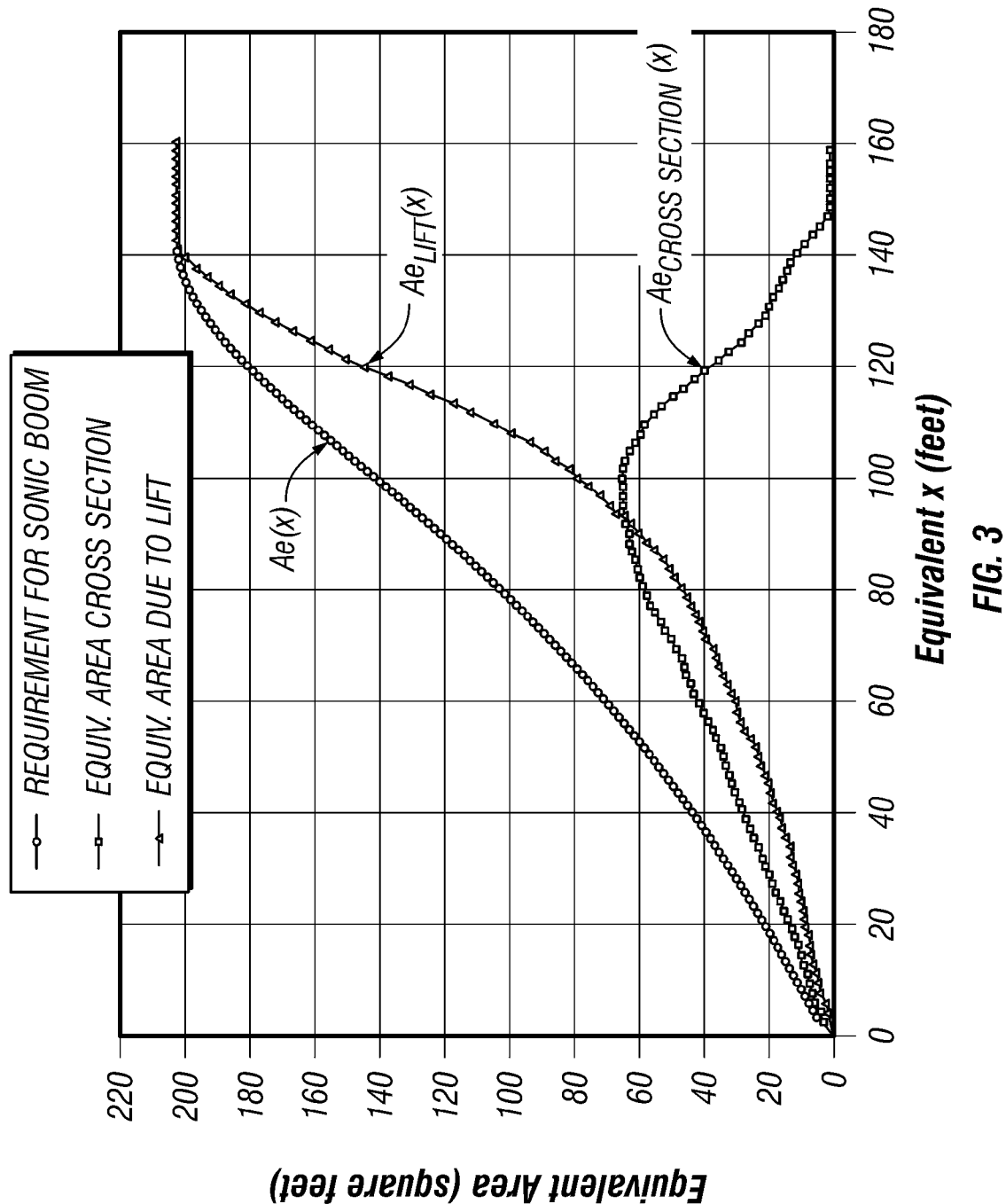
FIG. 3 illustrates target total equivalent area distribution $Ae(x)$, equivalent area distribution due to lift $Ae_{LIFT}(x)$ and equivalent cross sectional area distribution $Ae_{CROSS\ SECTION}(x)$ according to one exemplary embodiment of the methods and configurations disclosed herein.

For example, given the target design requirements of Table 1, a minimum vehicle length of about 160 feet may be calculated, and the target total equivalent area distribution curve Ae(x) shown in FIG. 3 may be determined, to meet the target sonic boom signature, using the "Darden" and/or "HybridF" software tools available from NASA.

Referring again to FIG. 1, major airframe external components (e.g., fuselage, wing, engines and nacelles, vertical tail, etc.) and aircraft wing configuration may next be defined in step 114 using any technique or methodology that is suitable for supersonic aerodynamic design and analysis. In one embodiment, wing configuration parameters, including wing camber, may be defined using methodology such as described in Carlson, H., et al., "Guides to AERO2S and WINGDES Computer Codes for Prediction and Minimization of Drag Due to Lift," NASA Technical Paper 3637, 1997, which is incorporated herein by reference. For example, given design parameters such as wing planform area, wing planform shape, and cruise lift coefficient, and using a software tool such as "WINGDES" available from NASA, wing configuration may be evaluated and selected, and the corresponding drag due to lift value for the selected wing configuration may be determined. However, it will be understood that any other methodology suitable for evaluating and selecting wing configuration may be alternately employed, e.g., computational fluid dynamics (CFD)-based design techniques.

Still referring to step 114 of FIG. 1, longitudinal lift distribution may be evaluated and equivalent area distribution due to lift as a function of equivalent length, $Ae_{LIFT}(x)$, determined using any technique or methodology that is suitable for supersonic aerodynamic analysis. In one embodiment, distribution of equivalent area due to lift $Ae_{LIFT}(x)$ may be determined using methodology such as described in Miranda, L., Elliott, R. and Baker, W., "A Generalized Vortex Lattice Method for Subsonic and Supersonic Flow Applications," NASA Contractor Report 2865, 1977, which is incorporated herein by reference. For example, given one exemplary selected wing configuration and target design parameters of weight, cruise altitude, and Mach number from step 110, the equivalent area distribution due to lift curve $Ae_{LIFT}(x)$ illustrated in FIG. 3 may be determined using a software tool such as "VORLAX" available from NASA. However, it will be understood that any other methodology suitable for evaluating and selecting wing configuration may be alternately employed, e.g., computational fluid dynamics (CFD)-based methods.

Figure 4:
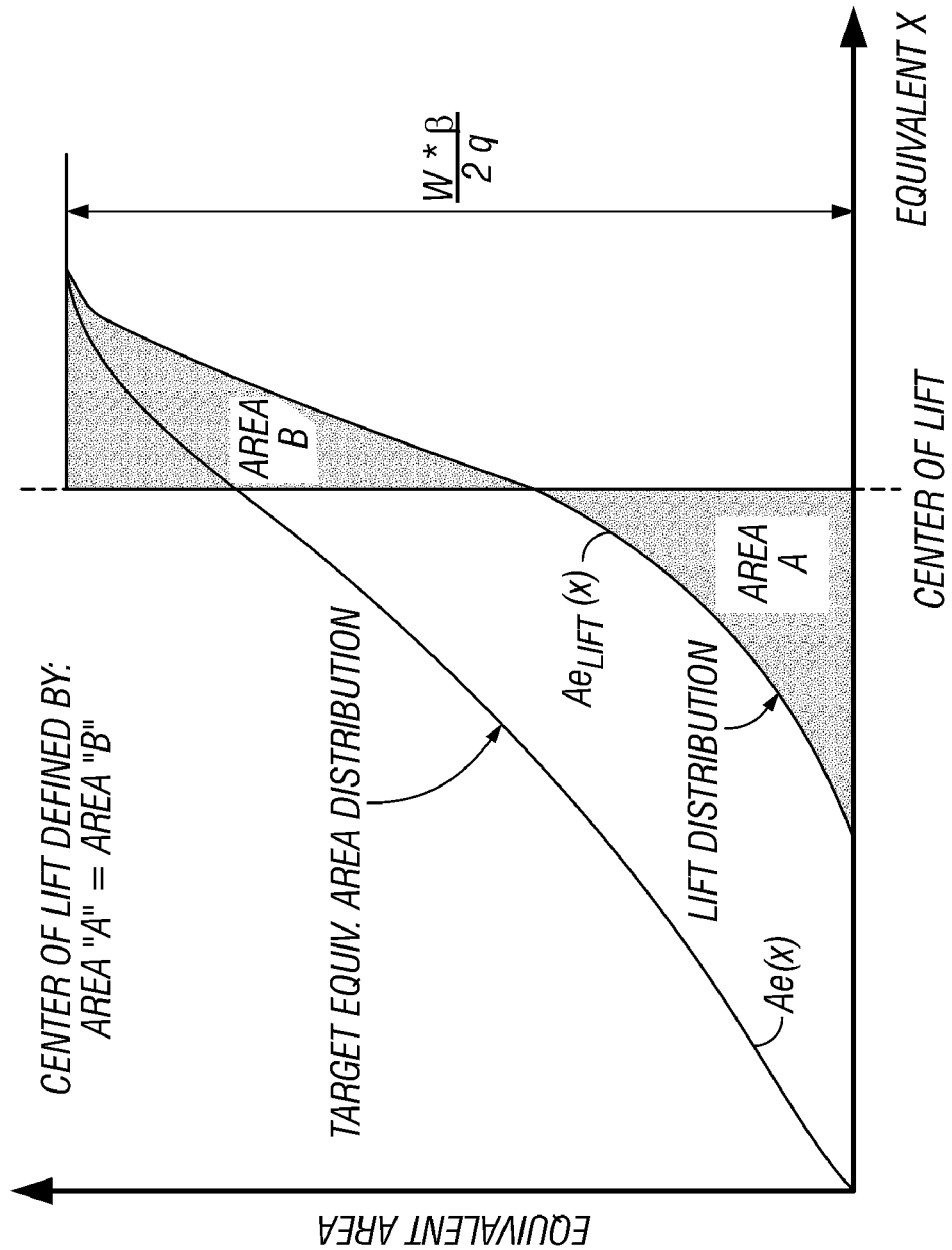
FIG. 4 illustrates target total equivalent area distribution $Ae(x)$, equivalent area distribution due to lift $Ae_{LIFT}(x)$, and center of lift according to one exemplary embodiment of the methods and configurations disclosed herein.

Once an equivalent area distribution due to lift, $Ae_{LIFT}(x)$ is determined for a particular selected wing design configuration, center of lift for the wing configuration may be determined. For example, FIG. 4 illustrates target total equivalent area distribution Ae(x) curve and an equivalent area distribution due to lift $Ae_{LIFT}(x)$ curve for a given exemplary wing design configuration. As illustrated in FIG. 4, center of lift for a given wing design configuration may be determined as a function of equivalent length (X) at the point where area A beneath the $Ae_{LIFT}$ curve equals area B above the $Ae_{LIFT}(x)$ curve.

Returning to FIG. 1, equivalent body area distribution as a function of equivalent length, $Ae_{BODY}(x)$ may be defined in step 116. In this regard, equivalent body area distribution $Ae_{BODY}(x)$ is used to determine the available cross sectional area within the aircraft body, e.g., for placement of internal aircraft components. In one exemplary embodiment, an equivalent cross sectional area distribution curve $Ae_{CROSS\ SECTION}(x)$ may be determined by subtracting a corresponding $Ae_{LIFT}(x)$ curve from total target equivalent area distribution curve Ae(x). $Ae_{BODY}(x)$ in turn represents the remaining equivalent area left after accounting for the equivalent area of defined airframe components $Ae_{AIRFRAME\ COMPONENTS}$ (e.g., wings, tail, engine nacelles, etc.). The following equation represents the relationship between $Ae_{BODY}(x)$, Ae(x), $Ae_{LIFT}(x)$ and $Ae_{AIRFRAME\ COMPONENTS}$:

$$Ae_{BODY}(x)=Ae(x)-Ae_{LIFT}(x)-Ae_{AIRFRAME\ COMPONENTS}$$

Figure 5:
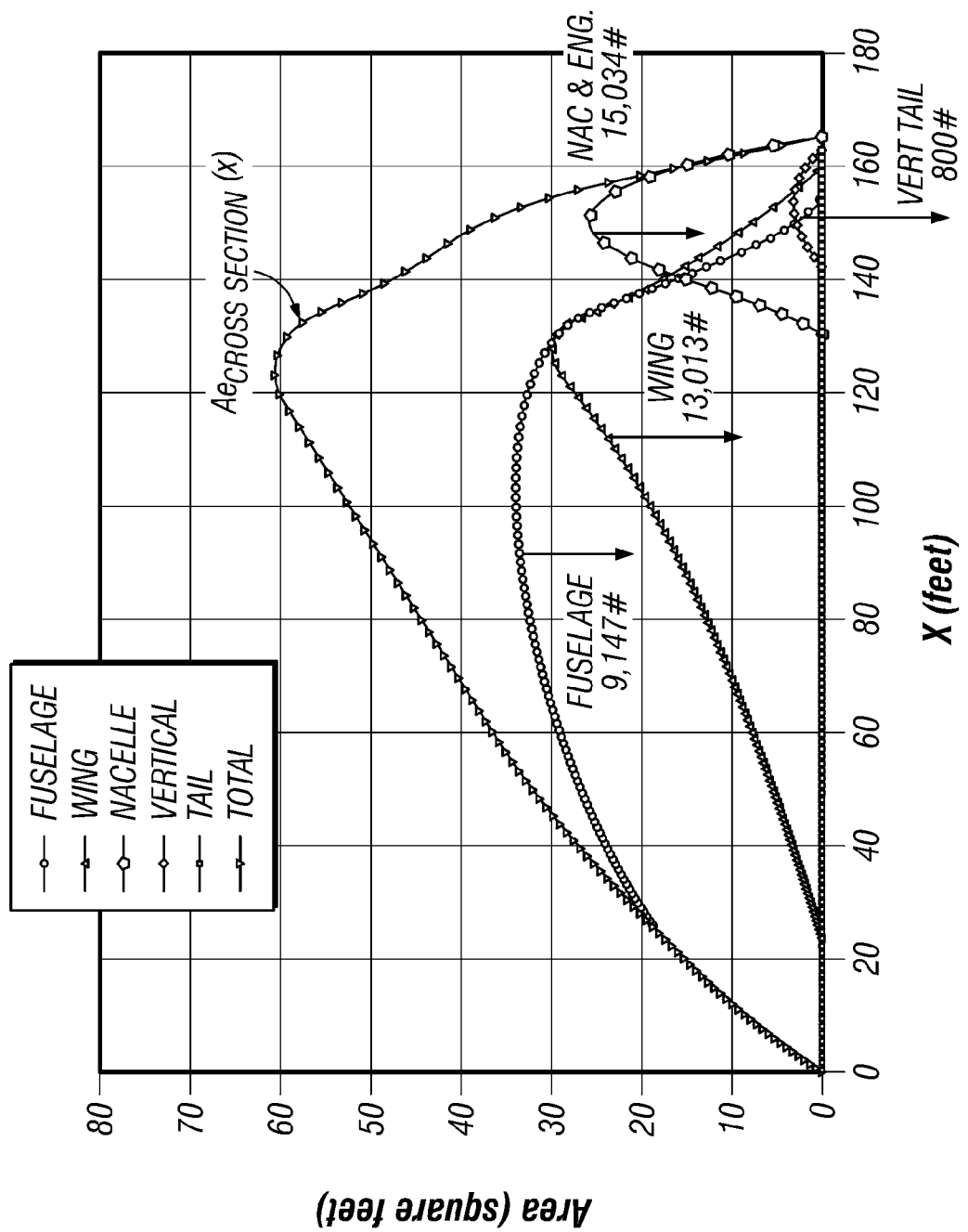
FIG. 5 illustrates total physical cross sectional area distribution $A_{CROSS\ SECTION}(x)$ and areas for major external airframe components according to one exemplary embodiment of the methods and configurations disclosed herein.

FIG. 3 illustrates allocation of target total equivalent area distribution Ae(x) into component curves of $Ae_{LIFT}(x)$ and $Ae_{CROSS\ SECTION}(x)$. In this regard, $Ae_{CROSS\ SECTION}(x)$ may be determined by subtracting $Ae_{LIFT}(x)$ from Ae(x). Then, for use in the development of the physical internal and external layout of the configuration, "equivalent" cross sectional areas may be converted into physical cross sectional areas. The distinction is that the equivalent areas are based on oblique cuts of the configuration (inclined from the direction of flight at the Mach angle), while the physical areas are based on normal cuts, perpendicular to the body X axis. FIG. 5 illustrates this transformation from the $Ae_{CROSS\ SECTION}(x)$ curve of FIG. 3, and its breakdown into specific area curves for the following major airframe components that have been specified or otherwise configured (e.g., in step 114) for the exemplary embodiment of FIG. 3: fuselage, wing, engines and nacelles, and vertical tail. For example, in one exemplary embodiment, a Mach 1 analysis case at 0 degrees angle of attack may be added to the boom analysis so that a set of normal-cut area distributions may be generated.

Figure 6:
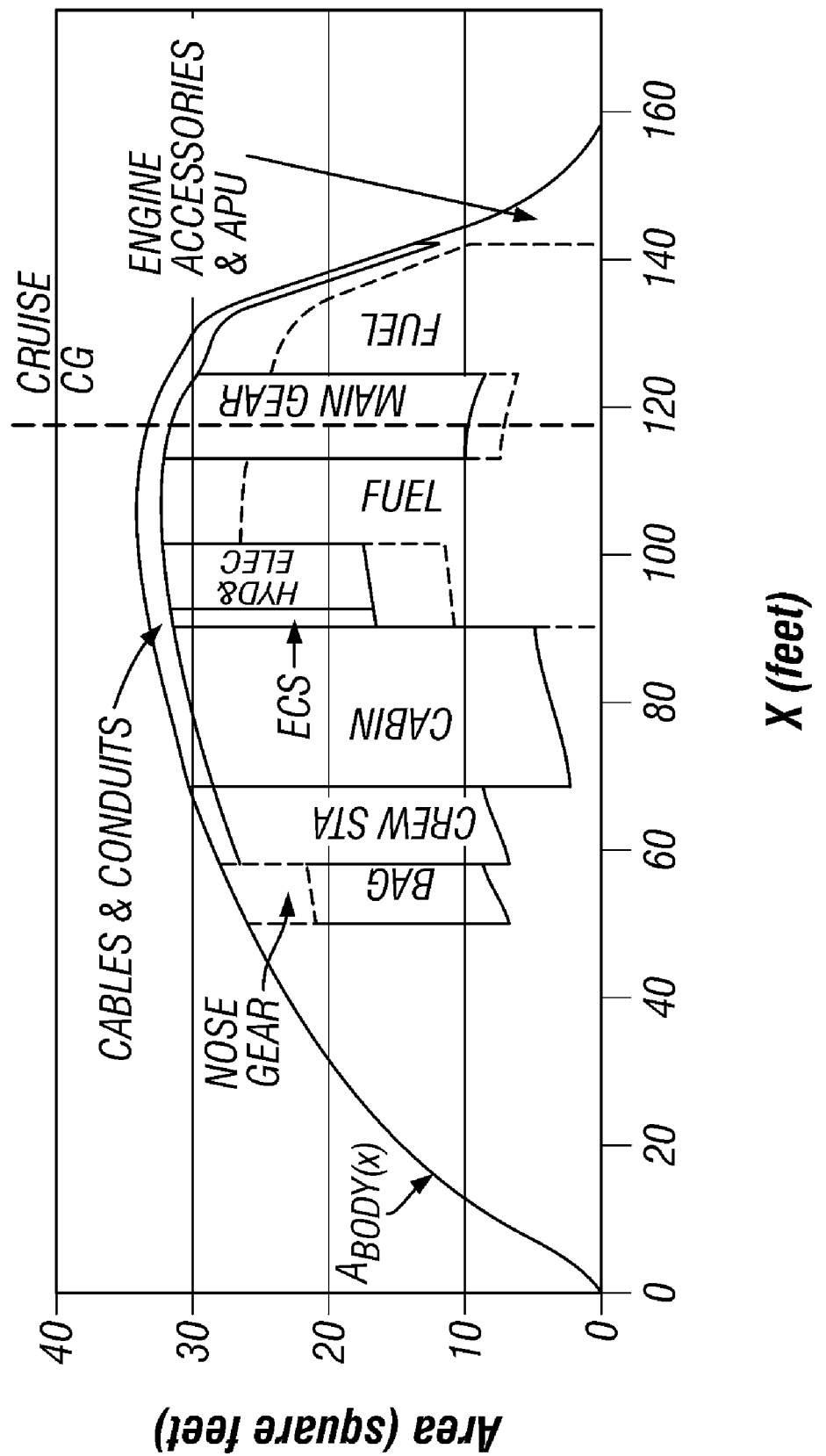
FIG. 6 illustrates physical body area distribution $A_{BODY}(x)$ and areas of internal aircraft components according to one exemplary embodiment of the methods and configurations disclosed herein.

FIG. 6 illustrates the body area distribution $A_{BODY}(x)$ curve that results from subtraction of the area of defined airframe components of FIG. 5 from the total cross sectional area distribution $A_{CROSS\ SECTION}(x)$ curve of FIG. 5. As will be described further herein, the $A_{BODY}(x)$ curve of FIG. 6 may be employed to allocate internal aircraft components for fuselage volume utilization purposes, and configuration of internal aircraft components and center of gravity range may be iteratively defined in steps 114, 116, 118, 120 and 122 by managing balance and volume to meet a given sonic boom constraint.

Figure 7:
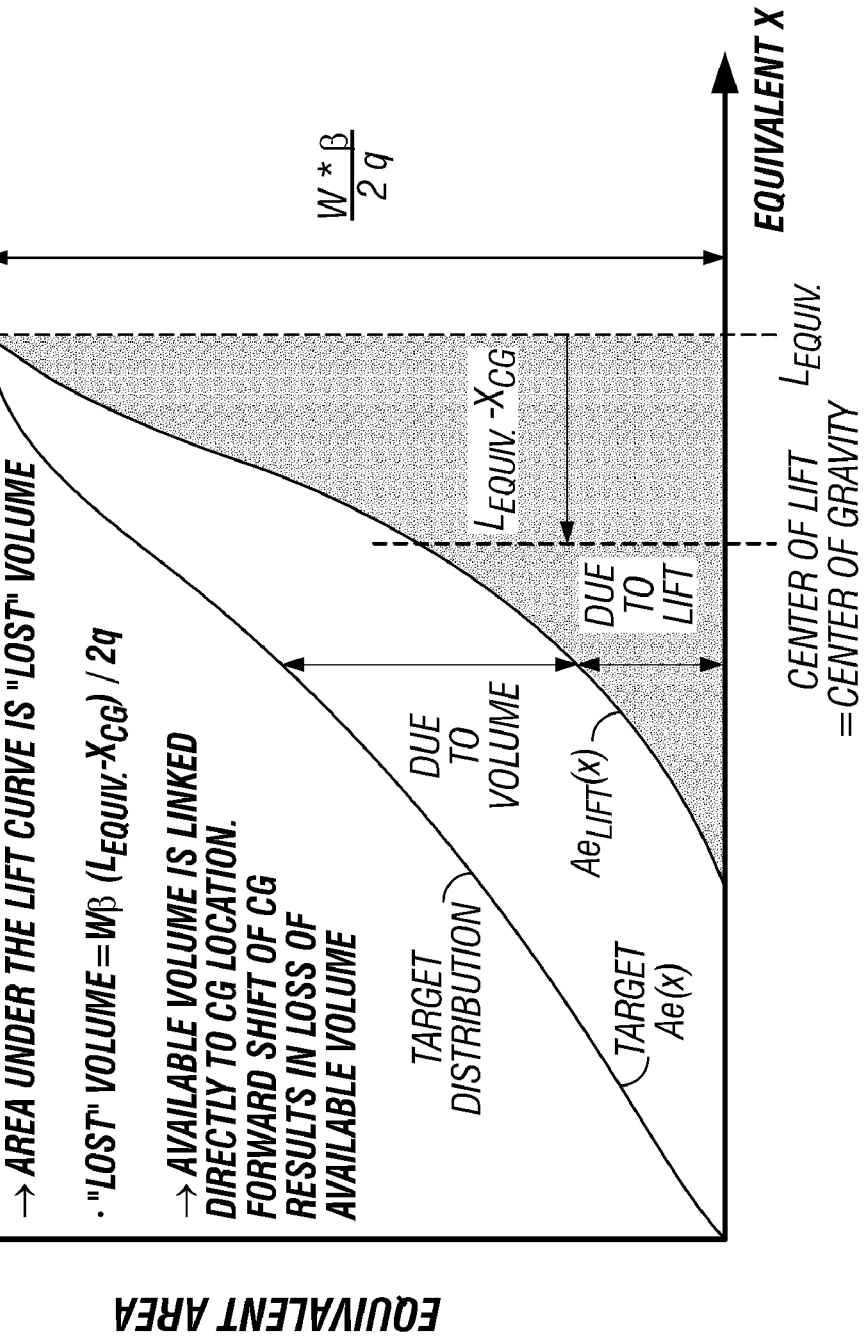
FIG. 7 illustrates the relationship between the center of lift, and the available physical volume of a configuration.

Referring now to FIG. 7, the center of lift for a given aircraft configuration must coincide with the center of gravity (CG), and the physical volume available for airframe components and internal aircraft components is equal to the area under the target equivalent area curve Ae(x), minus the area under the curve of equivalent area due to lift $Ae_{LIFT}(x)$. In this regard, the area under the $Ae_{LIFT}(x)$ curve may be thought of as the equivalent volume due to lift, and is directly linked to the center of lift (as described in relation to FIG. 4) and the corresponding CG location. Specifically, $$Ve_{LIFT}=(\beta/2q)*W*(L-X_{LIFT})$$

where $Ve_{LIFT}$ is the equivalent volume due to lift, W is the weight, L is the equivalent length, and $X_{LIFT}$ is the center of lift which must be the same as the center of gravity in trimmed flight. This equation illustrates that there is a direct trade off between CG location (i.e., which must correspond to the center of lift), and the remaining available physical volume.

This tradeoff is illustrated in FIG. 7. Moving the CG and corresponding center of lift forward will reduce the physical volume available. Moving the CG and corresponding center of lift aft will increase the volume, but it may not be possible to utilize it all while maintaining the center of gravity at the center of lift.

With respect to balance, it will be understood that it is possible to use pitch control surfaces to trim about a range of CG locations. However, use of trim affects the equivalent area distribution. A trim download at the aft end must be compensated by additional lift elsewhere, so that the total lift is still equal to the weight. Therefore, in one embodiment of the disclosed methods, any anticipated trim loads are included in the design equivalent lift distribution, i.e., control deflection is not used to make up for a failure to balance the configuration during preliminary stages of design.

It will also be understood that the foregoing discussion refers to the equivalent x-axis, not the body x-axis. Vertical displacement of lift or weight alters the relationship between equivalent x and physical x, and discussions relating physical balance to equivalent area distributions are therefore approximate. For example, a high-wing configuration tends to have a center of lift farther forward in physical coordinates than a low-wing configuration with the same equivalent lift distribution. Nevertheless, the CG and the center of lift must be close to each other on the equivalent axis in order to have any possibility of being at the same physical x location. Thus, when the vertical locations of the center of lift and of the CG are known, or can be estimated, then both may be translated into body axes and any error of this approximation may be eliminated. Such a correction has been made in the exemplary embodiment discussed herein.

In the practice of the aircraft configuration method 100 of FIG. 1, the available volume distribution is analyzed in steps 118 to 122 to ensure that it allows sufficient space for all internal items, with a center of gravity range that corresponds with the location of the center of lift. The methodology of this embodiment may be implemented to eliminate the need for defining a preliminary configuration and then sliding the wing fore or aft to achieve balance in later design stages, and/or to eliminate the need to add local "bulges" in the fuselage contour in later design stages to accommodate internal items. Either of these types of changes in later design stages may lead to deviation from the target equivalent area distribution, and a resulting unfavorable change in the sonic boom signature. This capability may be achieved by using a balance estimate that reflects the weight of each major internal or external weight item close to its correct location at the same time the wing planform and camber, wing location, and fuselage area ruling are being defined, and by verifying that the fuselage area distribution provides adequate volume for each major internal item in a location that is consistent with the balance calculation. In the event that insufficient volume exists for internal components and/or the center of gravity location does not correspond to center of lift, steps 114 through 122 may be iteratively repeated.

In the practice of the disclosed methods, linear aerodynamic methods may be used to define gross geometric and aerodynamic characteristics in order to enhance rapid development of a viable, aerodynamically efficient sonic boom-constrained configuration. To decrease cycle time of each iteration of the disclosed methods, the process for developing the internal aircraft layout or arrangement of internal aircraft components may be simplified, while at the same time retaining enough fidelity for CG estimation and volume verification. For example, in one embodiment, the problem may be reduced to two dimensions and embedded in the post-processing of the linear sonic boom analysis so that the impact on design cycle time is reduced. For example, in one embodiment for performing the internal layout and balance calculations (i.e., steps 118-122 of FIG. 1), using 3D CAD modeling may increase the cycle time by a factor of ten. In comparison, when simplified to two dimensions these same steps may be performed by only adding about 20% to the total cycle time. However, it will be understood that in other embodiments it is possible to include three-dimensional internal layout work (e.g., 3D CAD internal layout work) in each iteration of the design process if desired, although this may increase configuration cycle time as just described.

In the illustrated embodiment of FIG. 1, information available for input into the volume management and balancing tasks of steps 118, 120 and 122 include the design requirements of step 110 (e.g., sizing data such as weight and cruise altitude derived from the performance requirements of Table 1), the outputs of the aerodynamic analysis performed in steps 112 and 114 (e.g., including the cruise center of lift location), and the outer mold line ("OML") volume distributions of the major airframe components (e.g., wing, fuselage, empennage, and nacelles) as defined in steps 114 and 116. Using this information, steps 118, 120 and 122 may be performed as follows.

In the embodiment of FIG. 1, an aircraft may be characterized or described in terms of one or more selected airframe components (e.g., one or more selected major external airframe components such as, wing, fuselage, empennage, nacelles) defined in steps 114 and 116, and one or more selected internal components (e.g., one or more selected major internal items such as crew station, cabin, baggage compartment, landing gear, fuel, etc.) defined in step 118. The weight of each selected external and internal component may be described in terms of known quantities such as maximum takeoff weight ("MTOW"), mission fuel weight, wing area, etc.; and the volume of each internal component may be described in two dimensions, i.e., a cross sectional area and a length, or a cross sectional area distribution.

Table 2 shows design rules (i.e., exemplary values and/or relationships for weight, cross sectional area, length and volume) for an exemplary number of internal aircraft components as may be employed in step 118 of FIG. 1. Other design rules may include landing gear configuration (e.g., weight distribution between nose gear and main gear to obtain satisfactory handling, main gear spacing to prevent rollover, etc.) In the practice of one embodiment of the disclosed methods, target weight values may be initially based on simple relationships. In this regard, many internal subsystem weights (e.g., such as cabin furnishings, avionics, etc.) may be treated as constant, while other internal subsystem weights (e.g., landing gear, electrical wiring, aircraft hydraulic system, etc.) may be based on simple relationships to MTOW, wing area, or other high-level aircraft data that is available from the sizing. As desired or appropriate, a more thorough component weight buildup may be developed during the iterative process of the disclosed method, and that the design rules may be adjusted to maintain consistency with the weight buildup. It will be understood that other values, other internal aircraft components and/or other combinations of such components are possible in the formulation of design rules, and that these may vary as needed or desired to fit the requirements of a given application. For example, different design rules, target sonic boom signatures, etc. may be selected according to the design mission for the aircraft, e.g., military (fighter, transport, bomber, etc.), commercial (passenger, cargo, etc.), business, etc.

TABLE 2

| Item | Weight (lb) | Cross Section (ft²) | Length (ft) | Volume (ft³) |
|---|---|---|---|---|
| Landing Gear (Nose) | 900 | 7.0 | 7.8 | 55 |
| Landing Gear (Main) | 3,320 | 21.9 | 11.7 | 257 |
| Fwd Avionics + Crew Station + Galley | 1,363 | 20.0 (average) | 10.9 | 218 |
| Cabin + Lavatory + Aft Avionics | 1,912 | 26.8 | 22.8 | 611 |
| Passengers | 1,200* | Included in Cabin | | |
| Baggage external to cabin | 800* | As required to provide 100 ft³ | | 100 |
| ECS Environmental Control System | 342 | 15.0 | 2.0 | 30 |
| Hydraulics, electrical | 3,088 | 15.0 | 8.0 | 120 |
| APU + airframe-mounted engine accessories | 420 | As required to provide 90 cu ft in aft end of fuselage | | 90 |
| Routing for cables, ducts, etc. | Included in various sub-systems | 1.8 | Aft end of nose gear bay to fwd end of accessories section | 1.8 ft² × length |
| Usable Fuselage Fuel | Volume × 50.25 lb/ft³ | As available, less 17% of local fuselage cross section for structure | User input, must be aft of passenger cabin | Integrated from length & area, less 0.6% unusable |
| Usable Wing Fuel | Volume × 50.25 lb/ft³ | N/A | N/A | 0.85 * 0.45 * OML volume of wing, less 0.6% unusable |
| Unusable Fuel | | | 0.6% of total fuel | |

*Total payload is 1200 lb for this embodiment, and a worst-case distribution between Cabin and Baggage was used for any given CG limit.

An arrangement of the external airframe components may be selected in step 116, for example, by assigning a CG location to each external item. In this regard, FIG. 5 shows one embodiment of an equivalent area diagram in which weight and CG locations have been assigned to the selected major external airframe components represented by the equivalent area curves that have been provided for the exemplary embodiment of FIG. 3. In this regard, the weight of each major external component (e.g., wing, fuselage, nacelles, and vertical tail) may be calculated or estimated using any suitable method or combination of methods. For example, weight of each major external component may be estimated in one embodiment by preliminary design methods such as are described in Torenbeek, Egbert, *Synthesis of Subsonic Airplane Design*, Delft University Press, Delft, Holland, 1982; and Roskam, Jan, *Airplane Design, Part V: Component Weight Estimation*, Roskam Aviation and Engineering Corporation, Ottawa, Kans., 1989; each of which is incorporated herein by reference.

CG placement for individual external airframe components may be performed in step 116 using any suitable methodology for calculating or estimating same. For example, referring to the illustrated embodiment of FIG. 5, the CG of selected individual external components (e.g., wing, fuselage, tail) may be placed at the centroid of volume for each component. For other selected external components, it may be desirable to define or specify an off-center CG location, e.g., based on the weight distribution characteristics of the particular component. For example, as illustrated for the embodiment of FIG. 5, the CG of the engine nacelle (i.e., including engine, nozzle, and engine-mounted accessories) may be placed at ⅔ of the nacelle length, e.g., based on a preliminary layout of the nacelle. In this regard, a standard nacelle may be designed around the baseline engine to provide adequate volume for the engine and all engine-mounted accessories. This may be scaled with the engine during sizing to meet the thrust requirements of the aircraft. Capture area may be subtracted out for the purposes of sonic boom and wave drag calculation. It will be understood that in many cases information regarding location and volume distribution of external airframe components may already be assembled, for example, from the definition of the external airframe components in step 114. It will be understood that CG location for individual external airframe components may be determined using a variety of other methods including, but not limited to, Roskam, Jan, *Airplane Design, Part V: Component Weight Estimation*, Roskam Aviation and Engineering Corporation, Ottawa, Kans., 1989; which is incorporated herein by reference.

Referring now to step 118 of FIG. 1, location of selected internal aircraft components may be defined using any suitable methods or combination of methods. For example, FIG. 6 shows one embodiment of in which internal aircraft components (e.g., nose gear, baggage, crew station, fuel tanks, main gear, engine, auxiliary power unit ("APU"), hydraulics and electronics, cables and conduits, etc.) have been arranged using an area-ruled fuselage diagram or "slug chart" for internal volume allocation purposes (e.g., arranged to fit under the equivalent body area distribution $Ae_{BODY}(x)$ curve of FIG. 6). To accomplish this task, fixed-shape internal components may be described, for example, in two dimensions by a cross-sectional area and a length. Suitable alternative methodology for defining location of internal aircraft components include, but are not limited to, methodology described in Roskam, Jan, *Airplane Design, Part III: Layout Design of Cockpit, Fuselage, Wing and Empennage: Cutaways and Inboard Profiles*, Roskam Aviation and Engineering Corporation, Ottawa, Kans., 1989; and Roskam, Jan, *Airplane Design, Part IV: Layout Design of Landing Gear and Systems*, Roskam Aviation and Engineering Corporation, Ottawa, Kans., 1989; each of which is incorporated herein by reference. Other suitable methodology includes, but is not limited to, "FLOPS" software tool available from NASA.

Fuel may be assumed to fill available volume in appropriate sections of airframe (e.g., the wing and/or fuselage) according to standards, specifications and/or design requirements for a given application, e.g., such as may be found described in Raymer, Daniel, *Aircraft Design: A Conceptual Approach*, $3^{rd}$ Edition, American Institute of Aeronautics & Astronautics, Reston, Va., 1999, which is incorporated herein by reference. For example, referring to the illustrated embodiment of FIG. 6, fuel may be assumed to fill available volume in appropriate sections of an airframe subject to a structural allowance of 15% in the wing and 17% in the fuselage, along with an allowance of 0.6% for unusable fuel. In the illustrated embodiment of FIG. 6, it was further required that sufficient volume be provided to meet target design parameters, and that no fuselage fuel be placed forward of the aft cabin bulkhead.

Design rules for wing fuel may be determined using any method of calculation or estimation. In the illustrated embodiment, for example, design rules for wing fuel may be determined by analyzing the volume of a variety of swept wing configurations assuming that fuel may be located between 18% and 65% chord and from side-of-body to 60% semispan. It has been found to be a good approximation that this region encompasses 45% of the total wing volume, and that the centroid of the fuel volume is very close to the centroid of the total wing volume. By using such methodology, the need for a detailed fuel calculation on each candidate wing planform may be eliminated. However, it will be understood that in other embodiments of the disclosed methods, such detailed fuel calculations for each wing planform may be employed if so desired. In the illustrated embodiment, the usable fuel volume was then reduced by the 15% structure allowance, and by 0.6% for unusable fuel.

As shown in the illustrated embodiment of FIG. 6, no explicit volume may be allocated for the flight control system. Instead, centralized flight control components may be considered to be included in the crew station, avionics, and hydraulic/electrical bays. The actuators themselves may be considered as located in the wing and tail surfaces. The weights of the surface controls may be allocated to the wing and empennage for the purposes of the balance calculation. However, it will be understood that alternate methodologies are possible in which volume may be allocated for these or other individual components.

Following step 118, step 120 may be performed, for example, using the volume data of Table 2, and an area-ruled fuselage diagram methodology such as illustrated in FIG. 6 or other suitable volume representation methodology to verify that all internal aircraft components (e.g., fuel, cabin, subsystems, etc.) fit within available fuselage volume.

Figure 8:
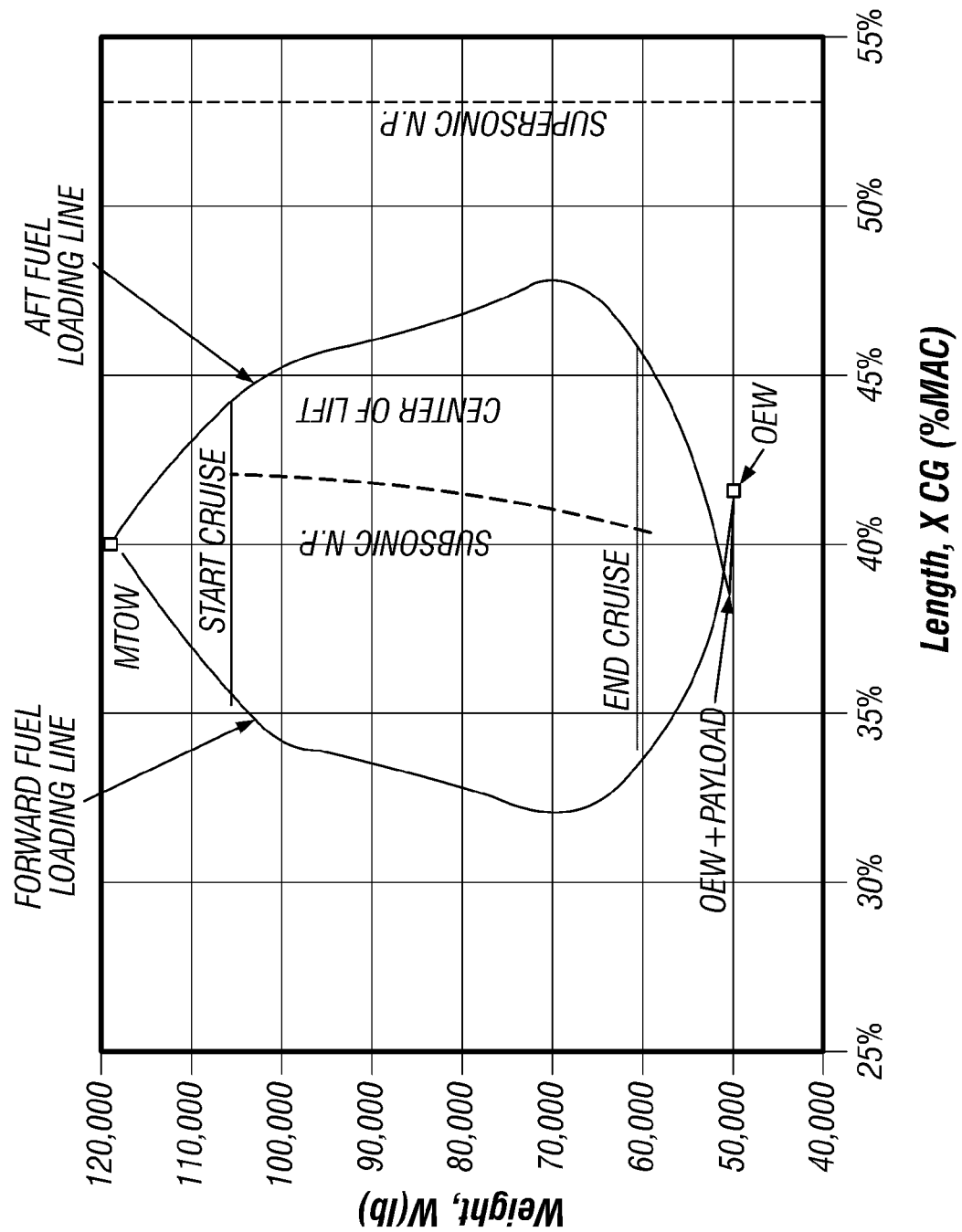
FIG. 8 illustrates available center of gravity range in relation to weight and length according to one exemplary embodiment of the methods and configurations disclosed herein.

Step 122 may be performed, for example, using a center of gravity diagram such as illustrated in FIG. 8 to verify that the center of lift fits within the available center of gravity range for the defined sonic boom constrained aircraft configuration of steps 114, 116 and 118. This may be accomplished, for example, by requiring that it be possible to place the CG at the cruise center of lift, at all weights from start of cruise to end of cruise. In this regard, FIG. 8 is the resulting center of gravity diagram for the exemplary sonic boom constrained aircraft configuration represented by the allocation of external and internal components in FIGS. 5 and 6. In FIG. 8, the available center of gravity range is shown defined in relationship to weight and length (i.e., as a percentage of mean aerodynamic chord "MAC") between operating forward and aft fuel loading lines and between operating empty weight ("OEW"), OEW+Payload and maximum take off weight ("MTOW"), while center of lift is defined as the dashed line between weight at start of cruise (i.e., about 106,000 lbs) and weight at end of cruise (i.e., about 61,000 lbs). As shown in FIG. 8, the center of lift falls within the available center of gravity range. Also shown are supersonic neutral point ("supersonic n.p.") and subsonic neutral point ("subsonic n.p."), which indicate that the exemplary configuration is stable.

It is noted that the forward and aft fuel loading lines of FIG. 8 do not represent actual CG travel, but rather represent the attainable CG range, i.e., the CG may be placed anywhere within the range shown through fuel management. In this regard, a fuel management system has been assumed in the development of the illustrated embodiment of FIG. 8, so that the CG may be controlled within a range that is bounded by the forward-most and aft-most fuel loading at a given weight. Presence of a fly-by-wire control system is also assumed for the embodiment of FIG. 8, however, the maximum unstable margin has been limited for this embodiment to 5% MAC in order to avoid placing excessive demands on the performance and sophistication of the stability augmentation system (i.e., in this exemplary embodiment it was required that the center of gravity be no more than 5% MAC aft of the neutral point, in subsonic or supersonic flight and at all weights). It will be understood that the embodiment of FIG. 8 is exemplary only and that any other suitable methodology may be employed to verify that the center of lift fits within the available center of gravity range (i.e., to verify that it is possible to place the CG at the cruise center of lift at all weights from start of cruise to end of cruise), whether or not a fuel management system and/or other type of stability augmentation system is employed. Examples of other suitable methodology includes, but is not limited to, Torenbeek, Egbert, *Synthesis of Subsonic Airplane Design*, Delft University Press, Delft, Holland, 1982; and Roskam, Jan, *Airplane Design, Part V. Component Weight Estimation*, Roskam Aviation and Engineering Corporation, Ottawa, Kans., 1989; each of which is incorporated herein by reference.

As illustrated for the exemplary embodiment of FIG. 1, steps 114 to 122 may be iteratively performed based on the outcome of steps 120 and/or 122 in order to simultaneously manage the equivalent area due to lift $Ae_{LIFT}(x)$, the equivalent cross sectional area distribution $Ae_{CROSS\ SECTION}(x)$, and the CG of the vehicle. For example, if it is found in step 120 that there is insufficient volume for location of internal aircraft components within the available internal volume and according to the given design rules (e.g., as specified in Table 2 for the illustrated embodiment), then step 114 may be repeated to define a new aircraft wing configuration that attempts to address the volume insufficiency found in step 120, e.g., to define an aircraft wing configuration that results in a equivalent area distribution due to lift curve $Ae_{LIFT}(x)$ that better fits the size/shape of one or more of the selected internal components and/or that has a shape that better fits the design rules for one or more of the internal components, such as increased room for fuel rearward of the aft cargo bulkhead. Steps 116 and 118 may then be repeated using the revised equivalent area distribution due to lift curve $Ae_{LIFT}(x)$, and sufficiency of volume for selected internal components evaluated again in step 120. This process may continue for as many iterations as necessary until a design with sufficient volume is achieved, or until it is determined that one or more target design parameters (e.g., such as one or more target design requirement/s of Table 1) need to be revised in step 110 to achieve a workable design that meets the requirements specified by the target design parameters as indicated by the dashed line returning to step 100 in FIG. 1. If it is determined that one or more target design parameters need to be revised, step 110 may be repeated with one or more new target design parameters that attempt to address the volume insufficiency found in step 120, e.g., by decreasing design mission range, decreasing design cruise speed, decreasing design payload, etc. Steps 112 to 118 may then be repeated, and sufficiency of volume for selected internal components evaluated again in step 120.

Once it is determined in step 120 that adequate volume exists for the selected internal components, then step 122 may be performed to verify that the center of lift of the current sonic boom constrained aircraft configuration fits within the available center of gravity range. If not, then the first course of action is to try to re-arrange the internal items within the existing external shape, to move the center of gravity range toward the center of lift. If this cannot be accomplished with internal rearrangement only, then step 114 may be repeated to define a new aircraft wing configuration that attempts to reconcile the discrepancy between center of lift and center of gravity range found in step 122. However, the conventional approach of changing the wing design, or simply moving the wing to place the center of lift within the existing center of gravity range, may lead to undesirable results when designing a sonic boom constrained aircraft. As noted previously, any shift of the center of lift will result in an increase or decrease in the available volume, which has already been found to be sufficient (step 120). More volume is usually undesirable, and less volume may leave insufficient space for required internal items.

In contrast to conventional methodology, the disclosed methods may be implemented to change the wing design so as to modify the lift distribution without changing center of lift, so that the total volume is unchanged but the volume distribution may be shifted. This may be accomplished by either spreading or consolidating the lift distribution. Since the available volume is represented by the difference between the target equivalent area distribution and the equivalent area due to lift, any change in the lift distribution will drive a change in the volume distribution.

FIG. 4 illustrates how this effect may be used to advantage in the practice of one embodiment of the disclosed methods. If the center of lift is to be maintained at the same location, then Area "A" must be equal to Area "B". If the lift distribution is spread out more in the lengthwise direction, but the center of lift is held at the same location, then both Area "A" and Area "B" in FIG. 4 will be increased. An increase in Area "A" is an increase in the equivalent area due to lift in the forward part of the vehicle, which must be accompanied by a corresponding decrease in the cross sectional area to maintain the same total equivalent area. Concurrently, the increase in Area "B" means a decrease in the equivalent area due to lift in the aft part of the vehicle, which must be accompanied by an increase in the cross sectional areas aft. Thus, the total available volume has not changed, but there is more usable volume aft and less usable volume forward. This change may mean that the internal items will have to be re-arranged, however, if the total volume has not changed it will still be sufficient. However, the center of gravity will be shifted aft as more items are moved toward the aft end of the vehicle. Thus, in one embodiment, spreading the lift distribution may be used to correct a nose-heavy condition by trading volume in the front of the vehicle for volume in the aft end of the vehicle, allowing internal items to be shifted aft. By similar reasoning, consolidating the lift distribution may be used to correct a tail-heavy condition.

After repeating step 114, steps 116 to 120 may then be repeated using the revised total equivalent area distribution, and assuming that sufficient volume for internal components is found to exist in step 120 the center of lift may be evaluated with respect to the center of gravity range again in step 122. If, (e.g., due to particular rules governing the internal layout), the volume is found to be either insufficient, or excessive, this may usually be corrected by a minor aft or forward shift, respectively, of the redesigned wing. The magnitude of the changes required will normally decrease with successive iterations.

The iterative process may continue for as many iterations as necessary until a design with sufficient volume and correlation between center of lift and center of gravity range is achieved, or until it is determined that one or more target design parameters (e.g., such as target design requirement/s of Table 1) need to be revised in step 110 to achieve a workable design that meets the requirements specified by the target design parameters as indicated by the dashed line returning to step 100 in FIG. 1. Similar to the above description with regard to step 120, if it is determined that one or more target design parameters need to be revised, step 110 may be repeated with one or more new target design parameters that attempt to address the discrepancy between center of lift and center of gravity range found in step 122 as indicated by the dashed line returning to step 110, e.g., by varying design mission range, varying design cruise speed, varying design payload, etc. Steps 112 to 120 may then be repeated, and center of lift may be evaluated with respect to the center of gravity range again in step 122.

Once a given aircraft design configuration passes the requirements of steps 120 and 122, sonic boom signature and/or other target design performance characteristics may be optionally verified against the design configuration in steps 124 and 126. For example, given characteristics of the aircraft design such as the fuselage and nacelle cross section area distributions, the lift distribution, and the planforms and thickness distributions of all aerodynamic surfaces, a sonic boom signature of a given design may be evaluated using a software tool such as "PBoom" available from NASA. Further information on such a tool may be found described in Coen, P., *Development of a Computer Technique for the Prediction of Transport Aircraft Flight Profile Sonic Boom Signatures*, George Washington University Master's Thesis, 1991, which is incorporated herein by reference. However, it will be understood that any other methodology or combination of methodologies suitable for evaluating sonic boom signature may be employed in the practice of the disclosed methods, e.g., such as CFD-based pressure signature calculation.

Figure 9:
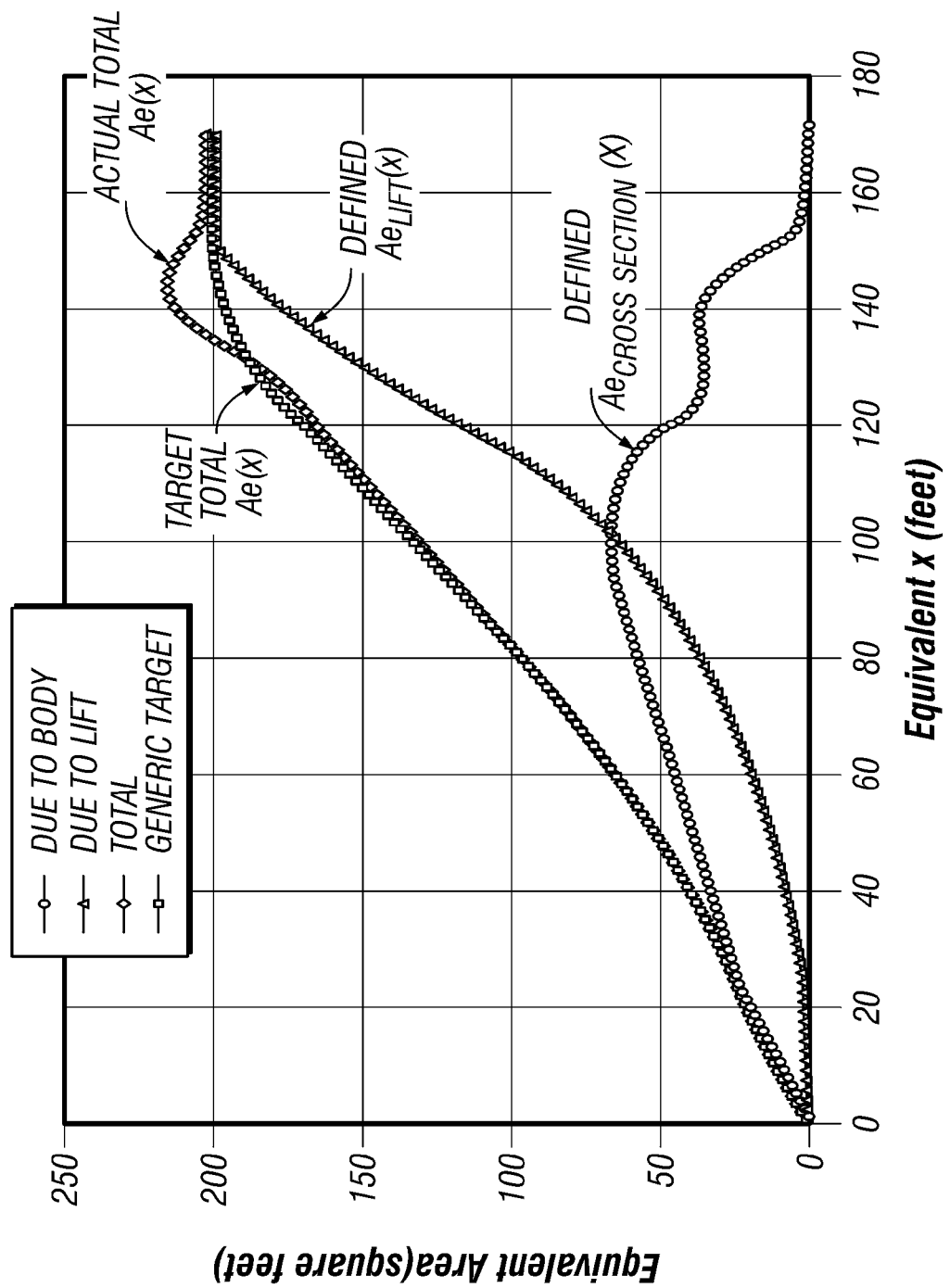
FIG. 9 illustrates target total equivalent area distribution curve $Ae(x)$, as well as equivalent area distribution due to lift $Ae_{LIFT}(x)$, equivalent cross sectional area distribution $Ae_{CROSS\ SECTION}(x)$, and actual total equivalent area distribution curve $Ae(x)$ disclosed herein.
Figure 10:
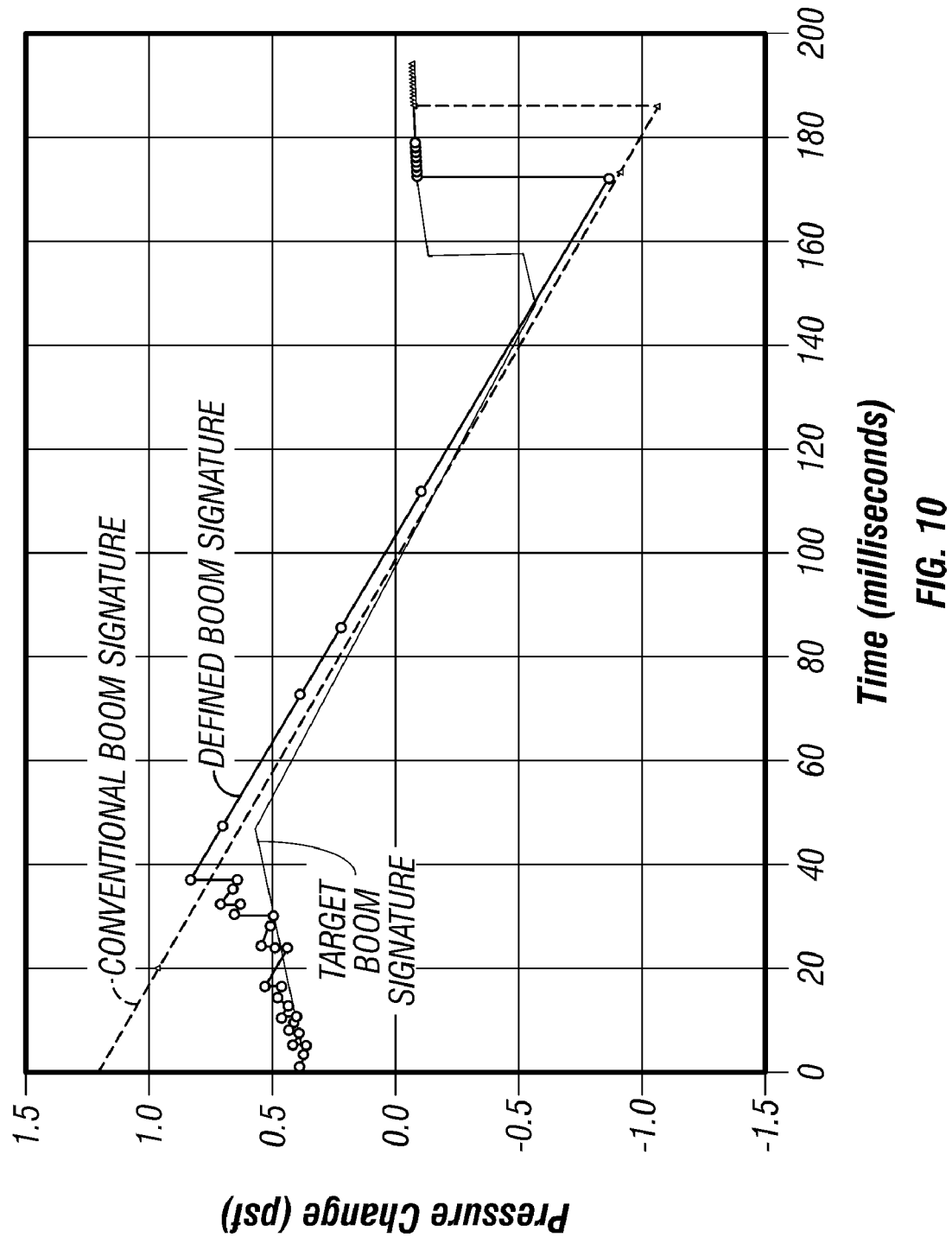
FIG. 10 illustrates target and defined sonic boom signatures according to one exemplary embodiment of the methods and configurations disclosed herein.
Figure 11A:
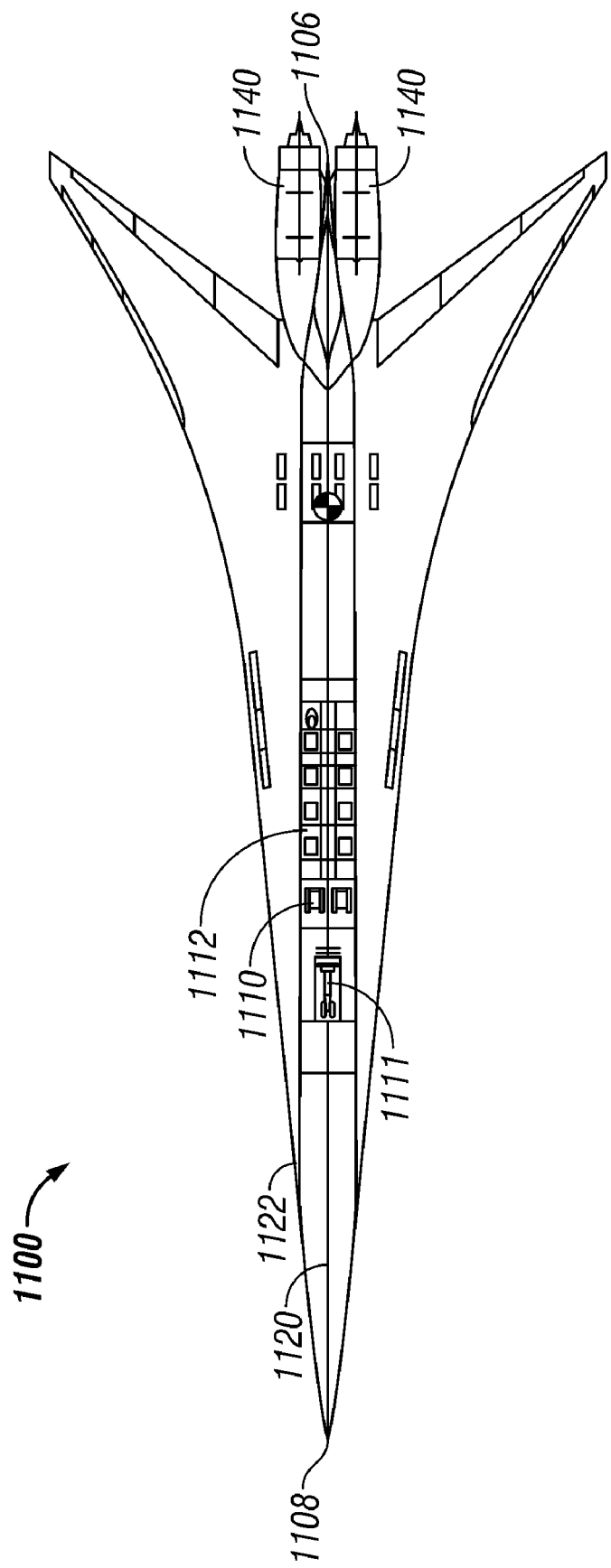
FIG. 11A illustrates a simplified top cross sectional view of a sonic boom constrained aircraft design configuration according to one exemplary embodiment of the methods and configurations disclosed herein.
Figure 11B:
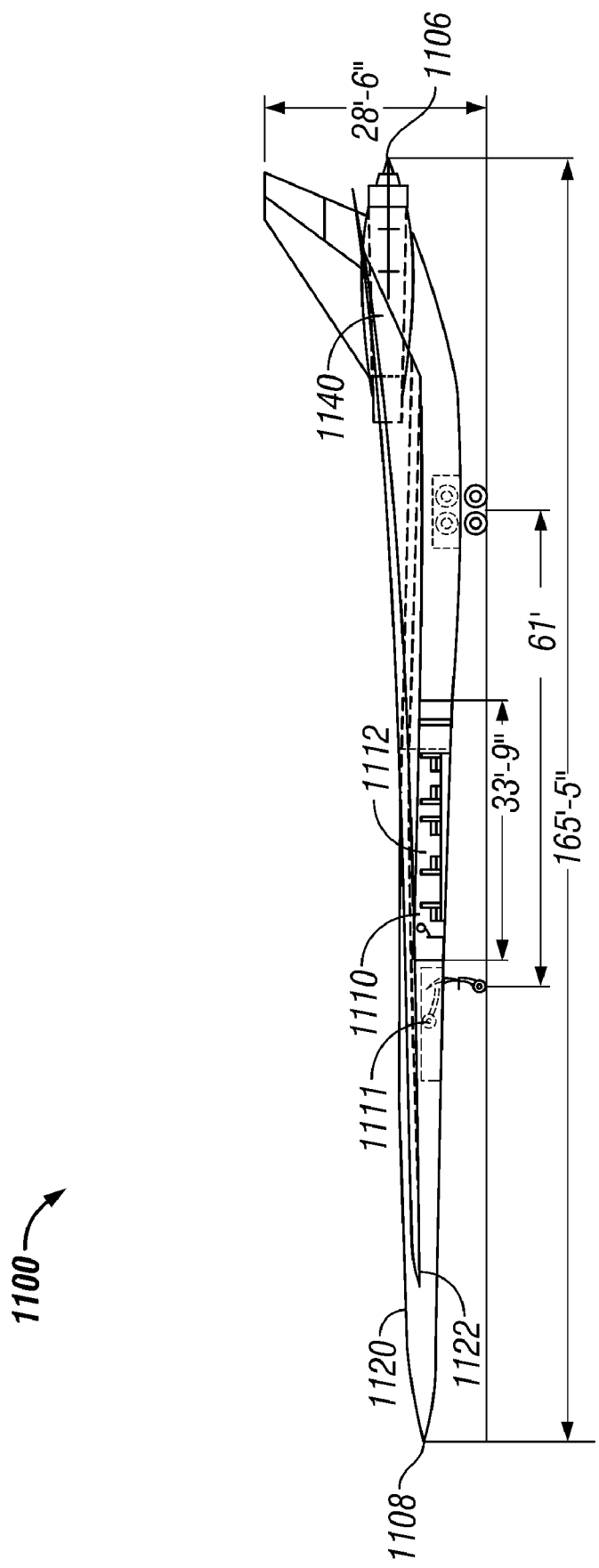
FIG. 11B illustrates a simplified side cross sectional view of a sonic boom constrained aircraft design configuration according to one exemplary embodiment of the methods and configurations disclosed herein.
Figure 11C:
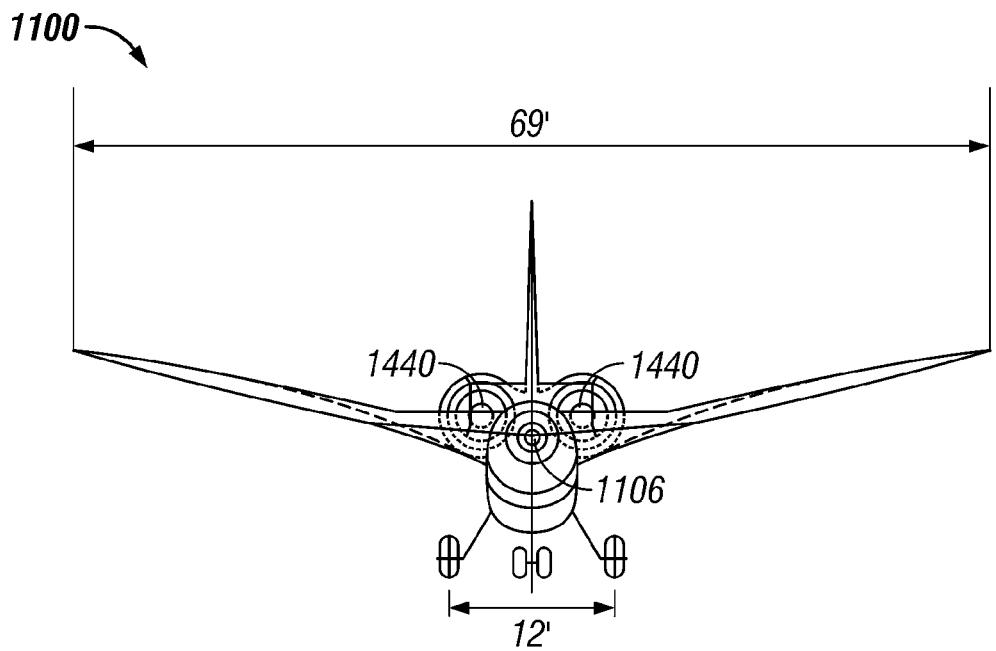
FIG. 11C illustrates a simplified front cross sectional view of a sonic boom constrained aircraft design configuration according to one exemplary embodiment of the methods and configurations disclosed herein.
Figure 11D:
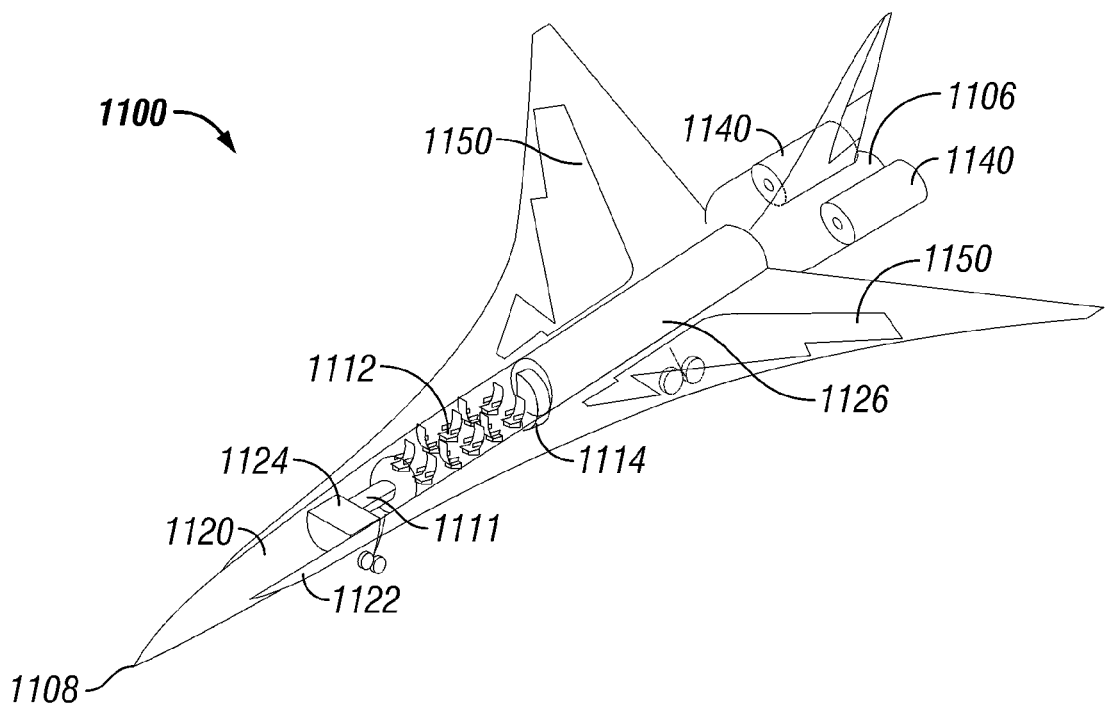
FIG. 11D illustrates a simplified perspective cross sectional view of a sonic boom constrained aircraft design configuration according to one exemplary embodiment of the methods and configurations disclosed herein.

To illustrate sonic boom verification according to one embodiment of step 124, FIG. 9 illustrates a total equivalent area distribution curve Ae(x), equivalent area distribution due to lift $Ae_{LIFT}(x)$, and equivalent cross sectional area distribution $Ae_{CROSS\ SECTION}(x)$ for an exemplary aircraft design configuration that have been defined using steps 110 to 122 of FIG. 1, i.e., using the target design requirements of Table 1. Also shown in FIG. 9 is the target total equivalent area distribution curve Ae(x) of FIG. 3. FIG. 10 illustrates the sonic boom signature defined for the same exemplary aircraft design configuration at initial cruise, along with the original target constrained sonic boom signature of FIG. 2.

In step 124, a sonic boom signature for a given aircraft design configuration may be evaluated against target sonic boom signature in any suitable manner. An aircraft design configuration may be rejected if it does not meet or exceed all constrained sonic boom aspects of a target constrained sonic boom signature, or alternatively it may be accepted if it comes close to meeting the target constrained sonic boom signature (e.g., within a given design tolerance that is specified or considered acceptable for a given situation). Such design decisions may be made, for example, based on weighing the relative importance of meeting one or more target design parameters (e.g., take off noise requirement) versus strictly achieving the target constrained sonic boom signature. Alternatively, a given aircraft design configuration may be conditionally rejected if attempts at further optimization are desired (whether or not they may be successful). In the latter case, the given aircraft design configuration may be ultimately accepted if further optimization is not possible.

For example, as illustrated in FIG. 9, the design total equivalent area distribution shows deviation from the target equivalent area distribution of FIG. 3 in the form of a hump above the target curve near the aft end of the aircraft design. This hump of the design above the target curve is due to the engine nacelle configuration (see FIG. 5) required to meet the Stage 4 airfield noise limits specified in Table 2, i.e., the engines have higher bypass ratio and larger diameter than would be required if designed solely for a supersonic cruise condition. As illustrated in FIG. 10, the nacelles are located far enough aft that the initial boom overpressure is not affected; however, the nacelles are responsible for the secondary rise in the boom signature that is seen in FIG. 10 at between 30 and 40 milliseconds. The small dip below the target equivalent area distribution, just ahead of the nacelle, is a concession made to wave drag. Approximately 3 counts of wave drag were saved, with negligible effect on the boom signature, by making this local reduction in area of the fuselage. The sonic boom overpressure of this exemplary sonic boom constrained design, throughout the cruise segment of the mission, is summarized in Table 3.

TABLE 3

| Condition | Weight (lb) | Altitude (ft) | Initial ΔP (psf) |
| --- | --- | --- | --- |
| Initial | 106,000 | 57,300 | 0.40 |
| Mid Cruise | 80,000 | 62,400 | 0.33 |
| Final Cruise | 60,000 | 66,800 | 0.29 |

The exemplary design of FIGS. 9 and 10 and Table 3 may be rejected in step 124 of FIG. 1, e.g., if absolute conformance to the target equivalent area distribution of FIG. 3 and/or target sonic boom signature of FIG. 2 is required. In this case, step 114 may be repeated to again define major airframe external components in a manner that attempts to result in an aircraft design that meets the target total equivalent area distribution target sonic boom signature, and then steps 116 to 124 repeated in a manner as previously described. For example, engine nacelle configuration and/or location may be changed in an attempt to reduce the hump area shown in FIG. 9 and the secondary rise in the boom signature that is seen in FIG. 10. This process may continue for as many iterations through steps 114 to 124 as necessary until a design with acceptable equivalent area distribution and sonic boom signature is achieved. Alternatively, upon rejection of a sonic boom constrained design in step 124, the process may return to step 110 where one or more target design parameters may be altered (e.g., less stringent take off noise requirement in Table 1) in an attempt to reduce the hump area shown in FIG. 9 and the secondary rise in the boom signature that is seen in FIG. 10. This process may continue for as many iterations through steps 110 to 124 as necessary until a design with acceptable equivalent area distribution and sonic boom signature is achieved.

Once the sonic boom signature of a given aircraft design configuration is accepted in step 124, then one or more other target performance characteristics (e.g., lift drag ratio L/D, wave drag due to volume using "AWAVE" software tool available from NASA, etc.) may be evaluated and verified in step 126. As with step 124, a given aircraft design may be accepted or rejected depending on whether or not strict adherence to a given target performance characteristic is required, and/or based on weighing the relative importance between a given target performance characteristic/s relative to other target design parameters (e.g., target design requirements of Table 1). If target design performance is met by the given aircraft design (e.g., step 128) then the design may be accepted in step 129. In the event target design performance is not met by the given aircraft design, then a decision may be made in step 130 as whether to accept the lower design performance in step 132, or to attempt to iteratively improve performance of the aircraft design, e.g., by going back to step 114 or 110 as described further below. Alternatively, as was the case with step 124, a given design may be conditionally rejected in step 126 if it is desired to attempt further optimization of one or more performance characteristics.

As illustrated in FIG. 1, step 114 may be repeated from step 130 to again define major airframe external components in a manner that attempts to result in an aircraft design that meets the target design characteristics, and then steps 116 to 126 repeated in a manner as previously described. For example, wing configuration may be redesigned in step 114 for improved lift/drag (L/D) ratio. This process may continue for as many iterations through steps 114 to 126 as necessary until a design with acceptable L/D is achieved. Alternatively, the process may return from step 130 to step 110 where one or more target design parameters may be altered (e.g., reduced payload weight in Table 1) in an attempt to meet a specified design mission range with a lower L/D ratio. This process may continue for as many iterations through steps 110 to 126 as necessary until a design with acceptable equivalent area distribution and sonic boom signature is achieved.

It will be understood that the illustrated embodiment of FIG. 1 is exemplary only, and has been presented to illustrate and describe one example of how the disclosed methods may be implemented. In this regard, the order of steps 124 and 126 may be reversed, and/or the tasks of two or more steps (e.g., steps 118 and steps 120 and/or 122, or steps 124 and 126) may be performed together. It will also be understood that in other embodiments of the disclosed methods additional steps may be present, and/or one or more of the illustrated steps of FIG. 1 may be absent. For example, steps 114 to 122 may be performed without steps 110 to 122 and without steps 124 to 132 to configure external and internal aircraft components given a particular equivalent area distribution.

Furthermore, it will be understood that one or more steps of the exemplary embodiment of FIG. 1 may be optionally implemented in an automated or partially automated manner, e.g., as software implemented on a computer processor (e.g., personal computer or other suitable processor), dedicated hardware or combination thereof. However, it is not necessary that any one or more of the given steps of FIG. 1 be implemented in an automated manner in order to realize the benefit of the disclosed methods.

In one embodiment, steps 118 to 122 may be implemented as an automated tool that permits a user to rapidly manipulate the arrangement of internal aircraft components (step 118)

and monitor compliance with volume and center of lift/center of gravity requirements (steps 120 and 122). Such an automated tool may be implemented using any methodology suitable for allowing a user to specify location of one or more internal components, and automatically verifying compliance with the requirements of steps 120 and 122. For example, internal layout and balance calculations may be embedded in a spreadsheet or other suitable automated calculation mechanism, which may optionally also be employed to post-process and view the results of sonic boom analysis on the resulting design. However implemented, automated internal layout and balance calculations may also be linked in one exemplary embodiment to generate optional graphical displays of internal fuselage volume allocation (e.g., FIG. 6) and center of gravity diagram (e.g., FIG. 8) showing cruise center of lift, initial & final cruise weights, and the attainable range of CG location as a function of weight.

In the practice of the disclosed methods, graphical displays may be presented in any form suitable for display to a user to allow dynamic evaluation of a given arrangement of internal components, e.g., computer monitor, computer hardcopy print out, etc. Furthermore, provision may also be made to allow a user to input the locations (e.g., x-axis locations) of one or more selected internal aircraft components (step 118) so as to allow recalculation and generation of real time displays of fuselage volume allocation and center of gravity diagrams. In this manner, a user may immediately check for fit, fuel volume, and balance (steps 120 and 122); and to vary the locations of one or more internal components as may be desired to meet design requirements or to further optimize the design. In this regard, it may not be necessary to specify locations of all internal aircraft components in order to evaluate a given configuration is viable. For example, in some cases it has been found that the most influential variables are the location of the main cabin, and the start- and end-points of the fuselage fuel. In such cases, it is possible that only these three variables may be manipulated to quickly determine whether or not a configuration is viable under steps 118 to 122. To further facilitate automated and real time design optimization, a graphical user interface ("GUI") may be provided that allows a user to input and change the locations of one or more selected internal aircraft components using a mouse and pointer that may be movably displayed by the user over a fuselage volume allocation diagram.

It will be understood that other steps of a design process such as illustrated in FIG. 1 may also be automated, dynamically implemented, and/or graphically displayed in a manner similar to that described above for steps 118 and 122. For example, information such as contained in FIGS. 9 and 10 may be displayed in step 124 to allow user analysis and evaluation, with or without tabular information such as the information contained in Table 3. Similarly, information regarding performance characteristics for a given aircraft design may be displayed in any suitable fashion (e.g., for comparison to target performance characteristics) in step 126.

In one exemplary embodiment, execution of the design methodology of FIG. 1 (e.g., steps 110 to 132) may be fully automated and linked together in real time, for example, using software running on a suitable processor/s and/or suitable dedicated hardware. Such an embodiment may be implemented so that a user may manage the process via any suitable user interface (e.g., via keyboard, via GUI, etc.). Furthermore, a user may be allowed to input and/or modify existing information (e.g., target design parameters such as target sonic boom signature plot, design rules, etc.) at appropriate or suitable times during the iterative process of FIG. 1 (e.g., in steps 110 and 114) using a suitable user interface and/or by uploading data (e.g., via upload of target design data file, etc.). Information may be graphically displayed via computer monitor or other display to the user as it becomes available or upon user request (e.g., target equivalent area distribution curves, resulting equivalent area distribution curves, center of gravity diagram, resulting sonic boom signature plot, etc.). Location of external and internal aircraft components may be manipulated by a user, for example, using keyboard entry of coordinates, or using mouse pointer or other suitable input device (e.g., to manipulate location of external aircraft components relative to a displayed equivalent area distribution curve, to manipulate location of components relative to a displayed equivalent body area distribution curve, etc.). A user may be allowed to make decisions at appropriate decision points (e.g., regarding acceptance or rejection of a given aircraft design) in real time via suitable input using keyboard, GUI menu, etc. In one embodiment, a user may be allowed to customize the iterative process by returning to any given step in the process of FIG. 1 (or another embodiment of the disclosed methods) in order to make desired changes and to iterate the process. Thus, it will be understood that the particular iterative configuration described and illustrated in relation to FIG. 1 is exemplary only, and that a variety of other iterative configurations are possible.

Exemplary Design Procedure

FIGS. 11A-11D illustrate an exemplary sonic-boom constrained aircraft design configuration that may be obtained using the iterative design methodology of FIG. 1, and starting with design requirements of Table 1, target sonic boom signature of FIG. 2, design rules of Table 2, and target equivalent area distribution of FIG. 3. In the illustrated embodiment of FIGS. 11A-11D, a passenger aircraft having a payload area configured in the form of a passenger cabin is described and illustrated. However, it will be understood that an aircraft may be similarly configured using the disclosed methodology with alternative types of payload areas (or combinations of payload areas) instead of a passenger cabin, e.g., cargo areas, instrumentation areas, etc.

Figure 12:
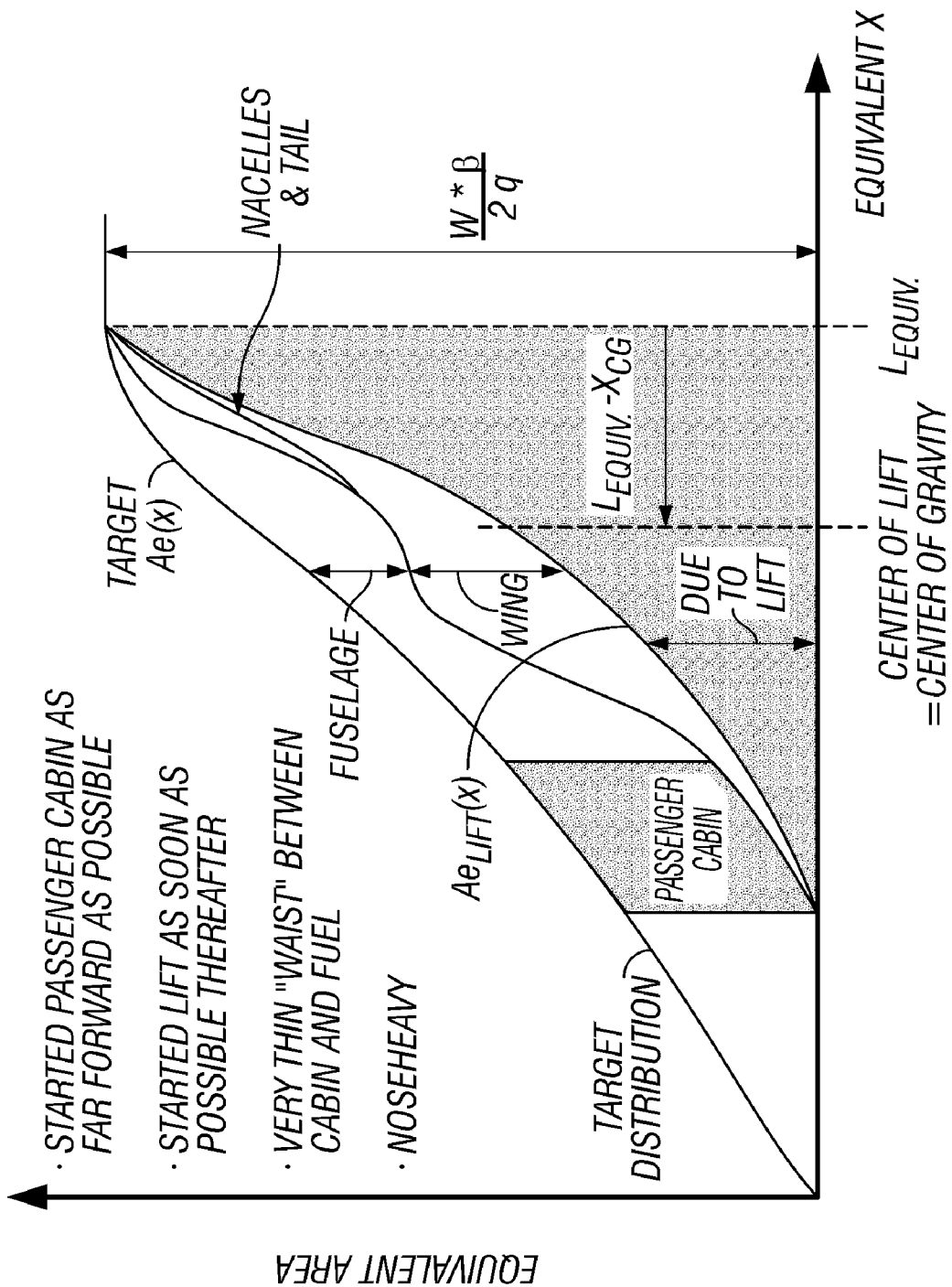
FIG. 12 illustrates distribution of equivalent area.

In this exemplary embodiment, the design methodology started with an initial sonic boom-constrained configuration having typical characteristics of an area-ruled fuselage with a "waist" at the wing, and the passenger cabin located in the larger section forward of the wing. This initial configuration failed to meet the desired design criteria due to insufficient fuel volume aft of the passenger cabin and due to the inability to place the CG far enough aft at start of cruise. To try to address these conditions, the relatively low-density passenger cabin may be pushed as far forward as possible, with the lift beginning as soon as possible thereafter, as illustrated in the equivalent area distribution diagram of FIG. 12. However, this approach tended to exaggerate the area ruling of the fuselage. When a balanced configuration was achieved, it had a very thin waist followed by a large bulbous region aft where most of the fuel was located. The main landing gear was located in the waist region, where there was not adequate volume for the gear bay.

Using the methodology of the disclosed methods, a new approach was tried as follows. The inboard wing leading edge was extended forward to the nose in the form of a chine, so that the lift began immediately and resulted in a lift distribution that begins ahead of the crew station and passenger cabin. Because the total equivalent area (i.e., lift+cross section) is constrained (i.e., the lift, as well as the physical volume of the wing, took up some of the equivalent area forward), the passenger cabin was moved aft. The "pinched" or thin waist was eliminated, providing more strength and recovering adequate volume for fuel and improving the prospects for successful integration of structure and main landing gear stowage. The new configuration is more easily balanced and has more centralized useful volume for payload and fuel, translating into a more compact mass distribution, as illustrated in the equivalent area distribution diagram of FIG. 13. Further, trading off cross section for lift in the nose region allows wave drag to be reduced.

Figure 13:
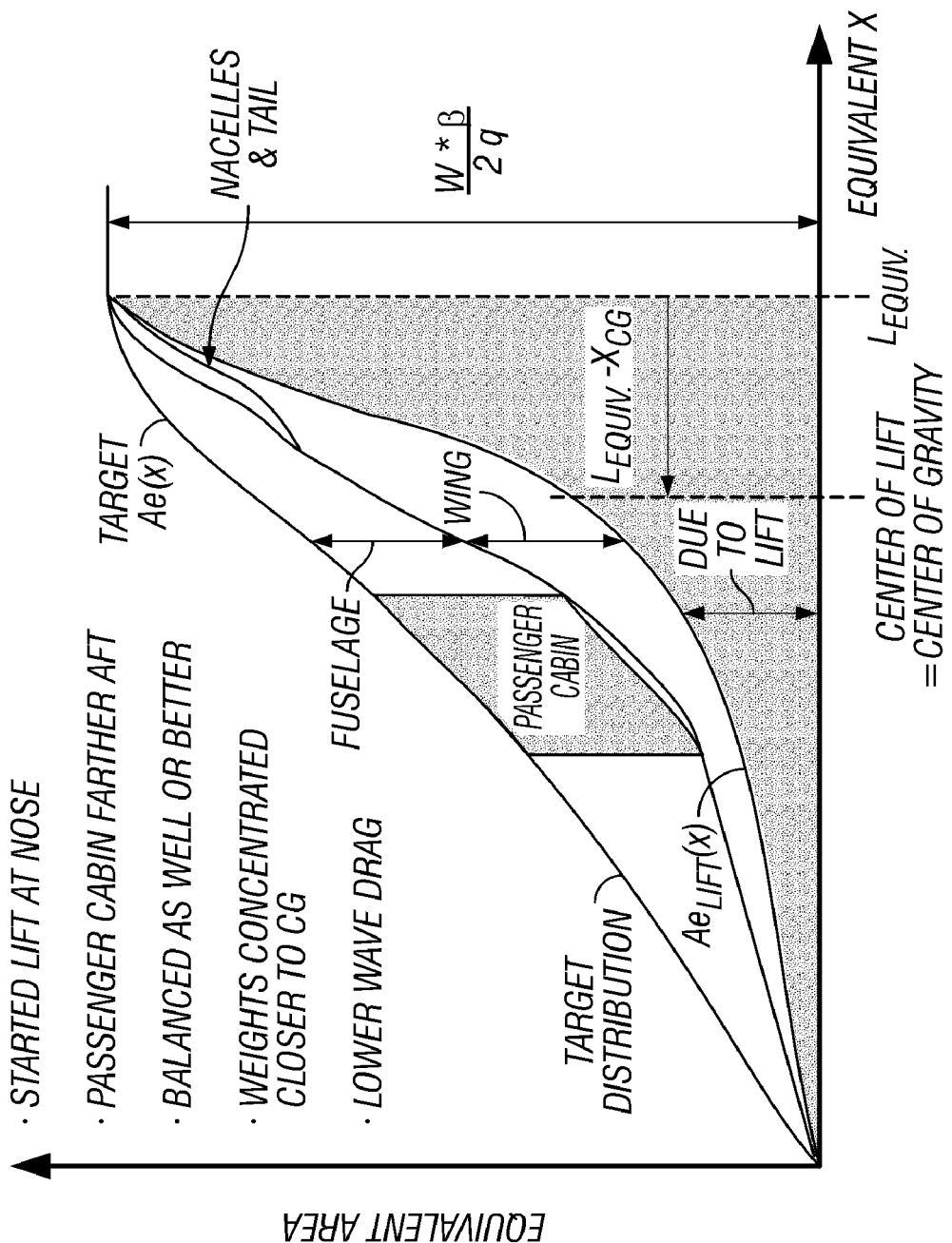
FIG. 13 illustrates distribution of equivalent area according to one exemplary embodiment of the methods and configurations disclosed herein.
Figure 14:
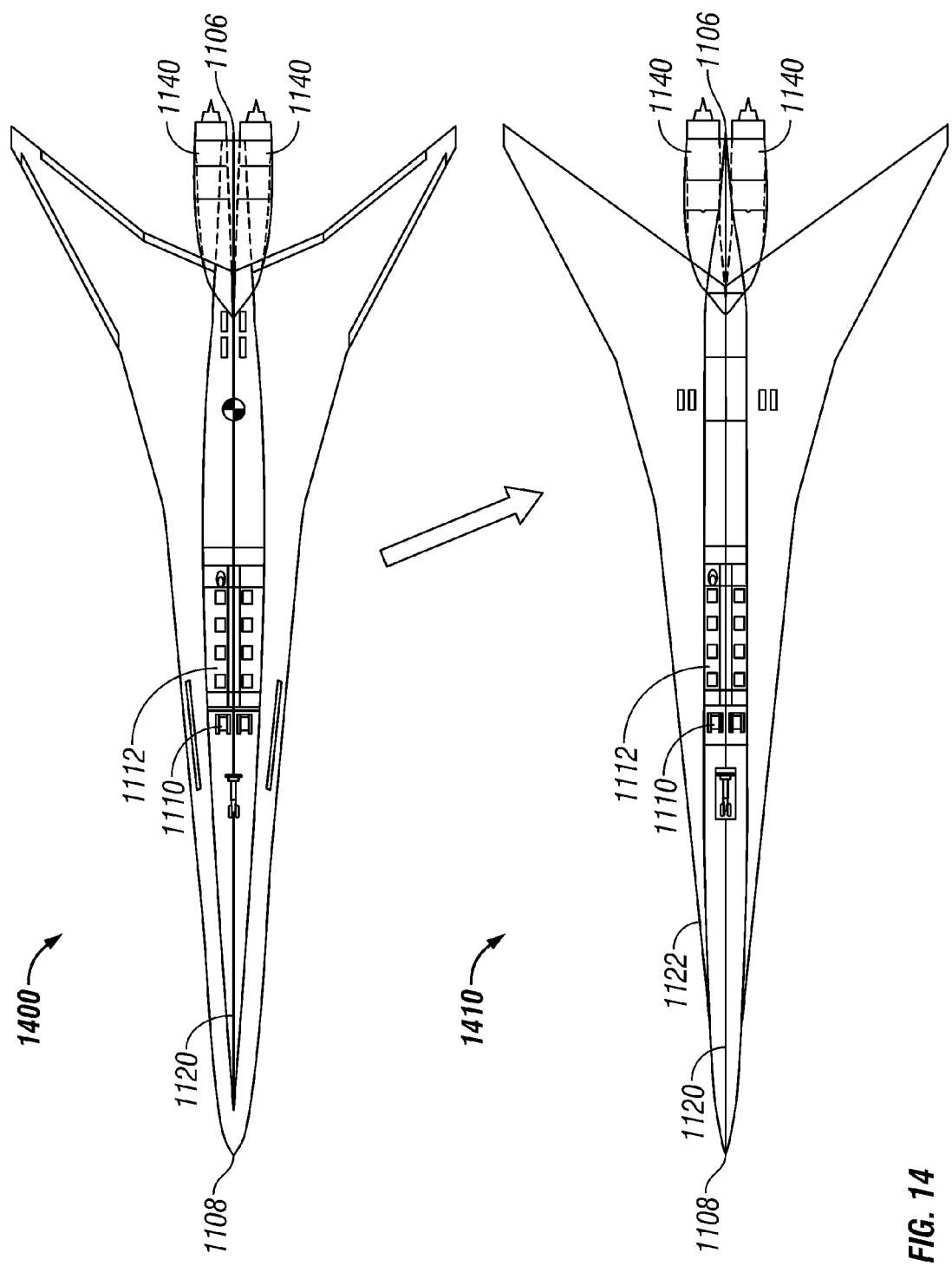
FIG. 14 illustrates simplified top cross sectional views of respective aircraft configurations according to one exemplary embodiment of the methods and configurations disclosed herein.

FIG. 14 illustrates a top view of an aircraft configuration 1400 that corresponds to the equivalent area distribution of FIG. 13. As may be seen in FIG. 14, aircraft configuration 1400 has the characteristic of a high wetted area of the wing, due to the long leading edge extension or strake. This caused a performance shortfall which was identified in step 126 of FIG. 1. The lift distribution was therefore shortened slightly to allow the strake length, and wetted area, to be reduced as illustrated by revised configuration 1410 shown in FIG. 14. By iteratively performing steps 114 to 126 of FIG. 1, a wing of reduced wetted area was designed (step 114) and other related external changes (step 116) and internal changes (step 118) were made. In steps 120 and 122, the new design was found to meet all volume and balance requirements. In step 124, the sonic boom signature was verified, and in step 126 the new design was found to meet its performance requirements. As more refined analysis was conducted, various factors in the sizing method (e.g., L/D, empty weight fraction, cruise altitudes, etc.) were updated to keep the sizing consistent with the latest analysis. This helped to keep the designs "on target" with respect to the mission performance requirement.

As previously described, the exemplary sonic-boom constrained aircraft design configuration 1100 achieved in the foregoing example is illustrated in FIGS. 11A-11D. Table 4 lists basic design characteristics for this configuration, and Table 5 lists wave drag characteristics of this configuration. In Table 5, D(wave) represents wave drag due to volume. Previously described FIG. 6 illustrates arrangement of internal aircraft components for this final configuration, and previously described FIG. 8 illustrates the CG diagram for this final configuration.

TABLE 4

| | |
|---|---|
| MTOW (lbs) | 119,200 |
| Wing Area (ft$^2$) | 2,743 |
| Wing Span (ft) | 69.0 |
| Aircraft Length (ft) | 165.5 |
| W/S (lb/ft$^2$) Wing loading | 43.5 |
| T/W Thrust-To-Weight-Ratio | 0.426 |
| OEW/MTOW | 0.417 |
| Wing Aspect Ratio | 1.74 |
| Outboard Wing Sweep Angle, Leading Edge, $\Lambda_{LE}$ (deg) | 60.0 |
| Wetted Area (ft$^2$) | 7,879 |
| Volume (ft$^3$) | 6,030 |
| Average Cruise Lift Coefficient, CL | 0.091 |
| Average Cruise L/D | 7.95 |
| Payload (lbs) | 1200 |
| Fuel (lbs) | 68,820 |

TABLE 5

| | |
|---|---|
| Length (ft) | 165.5 |
| Volume (ft$^3$) | 6,030 |
| D(wave)/q (ft$^2$) | 8.70 |
| D(wave)/D(wave)$_{ideal}$ | 4.4 |
| Wing Area (ft$^2$) | 2743 |
| CD_wave, Coefficient Of Wave Drag Due To Volume | 0.0032 |

As illustrated in the exemplary embodiment of FIGS. 11A-11D, the inboard wing leading edge 1122 is extended forward and intersects the fuselage substantially forward or ahead of the forward end of the crew station 1110. In this regard, the crew station or cockpit 1110 and cabin 1112 are located amidships, rather than in the nose section 1120 of the aircraft, and the forward end of the crew compartment 1110 begins aft of the wing root leading edge 1122, at about 30% of the fuselage length from the nose end 1108 of the aircraft. This feature distinguishes the present configuration from prior attempts to solve the problem of sonic boom suppression on a civil supersonic business aircraft. Also illustrated are nose baggage area 1124, cabin baggage area 1114, engines and nacelles 1140, fuselage fuel area 1126 and wing fuel area 1150.

In one exemplary embodiment, the crew station and passenger cabin may be characterized as being located amidships such that the forward end of the crew station 1110 is located at a distance (i.e., a distance greater than or equal to about 10% of the overall length of the vehicle, alternatively a distance that is equal to from about 10% to about 30% of the overall length of the vehicle) aft of the exposed wing root leading edge. In another exemplary embodiment, the crew station and passenger cabin may be characterized as being located amidships such that the forward end of the crew station is located at a distance of greater than or equal to about 30% of the total length of the aircraft in a direction aft of the nose end 1108 of the aircraft. It will be understood that in one exemplary embodiment, both of the preceding conditions of this paragraph may be present, and that in other embodiments only one of the preceding conditions may be present.

As illustrated in FIGS. 11A-11D, other characteristics of this exemplary design include a sweep of the wing leading edge 1122 that is everywhere greater than the Mach angle ("subsonic leading edge"). The design includes a wing dihedral of greater than or equal to about 6 degrees or alternatively from about 6 degrees to about 10 degrees (e.g., about 10 degrees in the illustrated embodiment), with no horizontal tail. Engines and nacelles 1140 are mounted in a position above the aft fuselage area. The fuselage cross sectional area increases monotonically from the nose 1108 to a point of maximum thickness approximately amidships, and then decreases monotonically to the tail 1106. The section of the fuselage ahead of the nose landing gear 1111 represents approximately 30% of the total length of the vehicle, and is configured in the exemplary embodiment to contain no major weight items. In this exemplary embodiment, this section functions mainly as a fairing to provide the desired sonic boom signature. In one exemplary embodiment, the point of maximum thickness of the fuselage cross section area may be characterized as being located at a distance of from about 50% to about 75% of the total length of the aircraft in a direction aft of the nose end 1108 of the aircraft.

As illustrated in FIGS. 11A-11D, the relatively aft location of crew station 1110 within the aircraft configuration 1100, coupled together with the controlled area distribution of the configuration 1100, tends to preclude the use of forward-facing windows or windscreen for pilot vision in this exemplary embodiment. A droop nose configuration for pilot vision may be employed, but would include approximately ⅓ of the total length of the aircraft, as well as a portion of the wing, which may be undesirable in this embodiment. Thus, in one embodiment, an artificial or synthetic cockpit vision system (e.g., such as forward-facing image sensors coupled to cockpit display screen/s, supplemented by computer-generated imagery based on digital maps, etc.) may be implemented to provide pilot vision to crew station 1110. Although such an artificial or synthetic vision system may be implemented in on embodiment as an alternative to forward-facing cockpit windows, it will be understood that one or more forward and/or side-facing cockpit windows may be provided in addition to an artificial or synthetic vision system in other embodiments. It will be understood that in FIG. 11D certain features and details of the aircraft configuration 1100 are shown in simplified manner, for example, including the tail, nacelle and engine inlet assemblies.

It will be understood that the foregoing design examples and the aircraft configurations illustrated herein are exemplary only, and that the disclosed methods may be implemented to achieve varying sonic boom-constrained aircraft configurations to meet target design parameters, design rules, etc. for a given design application, as well as to balance such design considerations against each other in a manner that meets the needs or desires for a given design application. It will also be understood that one or more aspects (e.g., steps or combination of steps of FIG. 1) may be beneficially implemented to design non-sonic boom constrained or subsonic aircraft configurations. In such a case, for example, a two-dimensional representation of the major internal items may be used to rapidly iterate the area-ruling of the fuselage to achieve supersonic drag improvements in the absence of any requirement on the sonic boom signature.

To the extent that it provides exemplary procedural or other details supplementary to those set forth herein, the following reference is specifically incorporated herein by reference: Aronstein, D. C. and Schueler, K. L., "Conceptual Design of a Sonic Boom Constrained Supersonic Business Aircraft", *American Institute of Aeronautics and Astronautics, 42nd Aerospace Sciences Meeting*, Reno, Nev., Jan. 5-8, 2004.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and aircraft configurations may be utilized in various combinations and/or independently. Thus, the invention is not limited to only those combinations shown herein, but rather may include other combinations.

What is claimed is:

1. A method of configuring a supersonic aircraft comprising the steps of:
   (a) determining a desired distribution of equivalent area versus equivalent length which meets a sonic boom criterion;
   (b) selecting a configuration of external airframe components and a distribution of body cross-sectional area versus equivalent length which together meet the desired distribution of equivalent area versus equivalent length;
   (c) selecting an arrangement of internal components by actuating a processor of a computer system to specify the arrangement of two-dimensional representations of internal components having dimensions of cross-sectional area and length to represent placement of the components along the length of aircraft;
   (d) determining if the selected arrangement fits the distribution of body cross-sectional area versus equivalent length; and if not, repeating at least one of steps (b) and (c).

2. A method as claimed in claim 1 further comprising the step of displaying the distribution of body cross-sectional area together with the two-dimensional representations of internal components as a human-readable two-dimensional image on a display device.

3. A method as claimed in claim 2 wherein the displaying step includes actuating the processor of the computer system and the display device to move the displayed representations in real time responsive to input from a human user.

4. A method as claimed in claim 1 wherein the step of selecting a configuration of external airframe components includes calculating a center of lift, the method further comprising the steps of automatically determining a center of gravity range based on the selected arrangement of internal components, determining if the center of gravity range includes the center of lift, and if not, repeating at least one of steps (b) and (c).

5. A computer system comprising a digital computer including a processor and a program instructing the computer system to perform a method as claimed in claim 1.

6. A computer system comprising a digital computer including a processor and a graphical display linked to said processor, and a program instructing the computer system to perform a method as claimed in claim 2.

* * * * *